(12) United States Patent
Heim et al.

(10) Patent No.: US 8,873,696 B2
(45) Date of Patent: Oct. 28, 2014

(54) SYSTEMS AND METHODS FOR DISMANTLING A NUCLEAR REACTOR

(75) Inventors: Robert R. Heim, Brighton, CO (US); Scott Ryan Adams, Longmont, CO (US); Matthew Denver Cole, Fort Collins, CO (US); William E. Kirby, Superior, CO (US); Paul Damon Linnebur, Milliken, CO (US)

(73) Assignee: Special Applications Technology, Inc., Loveland, CO (US)

( * ) Notice: Subject to any disclaimer, the term of this patent is extended or adjusted under 35 U.S.C. 154(b) by 706 days.

(21) Appl. No.: 12/967,068

(22) Filed: Dec. 14, 2010

(65) Prior Publication Data

US 2011/0235768 A1 Sep. 29, 2011

Related U.S. Application Data

(60) Provisional application No. 61/318,288, filed on Mar. 27, 2010.

(51) Int. Cl.
*G21C 19/00* (2006.01)
*G21D 1/00* (2006.01)

(52) U.S. Cl.
CPC *G21D 1/003* (2013.01); *Y02E 30/40* (2013.01)
USPC .......................................................... 376/263

(58) Field of Classification Search
USPC ................................................. 376/260–263
See application file for complete search history.

(56) References Cited

U.S. PATENT DOCUMENTS

| 4,664,873 A * | 5/1987 | Hendrich et al. ............. 376/260 |
| 2005/0135538 A1* | 6/2005 | Aoki et al. .................... 376/260 |

FOREIGN PATENT DOCUMENTS

JP 08075892 A * 3/1996

\* cited by examiner

*Primary Examiner* — Timothy A Brainard
(74) *Attorney, Agent, or Firm* — Hart IP Law & Strategies

(57) ABSTRACT

Systems and methods for dismantling a nuclear reactor are described. In one aspect the system includes a remotely controlled heavy manipulator ("manipulator") operatively coupled to a support structure, and a control station in a non-contaminated portion of a workspace. The support structure provides the manipulator with top down access into a bioshield of a nuclear reactor. At least one computing device in the control station provides remote control to perform operations including: (a) dismantling, using the manipulator, a graphite moderator, concrete walls, and a ceiling of the bioshield, the manipulator being provided with automated access to all internal portions of the bioshield; (b) loading, using the manipulator, contaminated graphite blocks from the graphite core and other components from the bioshield into one or more waste containers; and (c) dispersing, using the manipulator, dust suppression and contamination fixing spray to contaminated matter.

40 Claims, 30 Drawing Sheets

SYSTEMS AND METHODS FOR DISMANTLING A NUCLEAR REACTOR

RELATED APPLICATION

This application claims the benefit of U.S. Provisional Application No. 61/318,288 filed Mar. 27, 2010, titled "Systems and Methods for Dismantling a Nuclear Reactor," the disclosure of which is incorporated by reference herein.

GOVERNMENT LICENSE RIGHTS

This invention was made with government support under Contract No. 130529, awarded by the U.S. Department of Energy. The Government has assigned No. S-126,321 to this invention. The government has certain rights in the invention.

BACKGROUND

During the era when many nuclear reactor plants were constructed, techniques to decommission the nuclear reactors were generally not fully considered. Thus, many nuclear reactors were constructed without giving any consideration to dismantling the reactors at a future time.

One exemplary technique for decommissioning a nuclear reactor is via a "water platform" method, whereby the top of the reactor vessel is removed and the vessel is filled with water to provide a radioactive shield relative to the internal components of the reactor. A platform is placed on top of the water to provide access to reactor's internal components immediately underneath the platform. At this point, underwater cutting is performed on the portions of the reactor's internal components located immediately beneath the platform. The cut pieces are then loaded onto the platform and transferred to either a "wet cutting station" in which further underwater cutting is performed or a "dry cutting station" in which further cutting is performed in an air-controlled environment. The water level is then decreased, the platform lowered, and the cutting process is again initiated. This sequence of events is repeated until all of the reactor's internal components are removed. Thereafter, the cutting of the reactor vessel itself is initiated.

The water platform methodology is substantially limited in that it may result in human worker interaction with the sectioned reactor internal components, for example, during transfer of sectioned reactor components between the water platform and the wet/dry cutting stations. Additionally, the cutting process usually produces a significant amount of particles whereby respirators and HEPA ventilation are sometimes necessary to combat the effects of airborne contamination. Furthermore, the "shielding" water in the vessel will absorb particles produced during the cutting process whereby constant circulation and filtration of this fluid is necessary to remove liquid radioactive waste.

An alternate method of decommissioning a nuclear reactor was used on a retired nuclear reactor at the Shippingport Power Plant. The Shippingport nuclear reactor was an offspring of the Eisenhower presidency and thus its decommissioning was orchestrated by the United States Department of Energy. In decommissioning this unit, the reactor vessel was filled with concrete and then moved in one piece to a disposal site. The Shippingport reactor, which was rated at 72 megawatts, was significantly smaller than most of the commercial nuclear reactors in use or construction today. Nonetheless, the weight of the reactor when filled with concrete required the fabrication of special lifting equipment to lift the reactor from its underground housing. More particularly, the project required the erection of a gigantic frame, the construction of four huge hydraulic jacks, each having an approximately 6,000 ton lifting capacity, and the mounting of these jacks on the frame. In the transfer of the Shippingport reactor to the transport vehicle (a barge in this case), the jacks hoisted the reactor seventy-seven feet into the air, moved it approximately thirty-eight feet horizontally along a track and then lowered it onto a trailer.

The Energy Department's decision to decommission the Shippingport reactor in this manner, which avoided cutting apart the radioactive structure, saved an estimated seven million dollars and, perhaps more importantly, dramatically reduced worker exposure to radiation. However, such a procedure is probably not possible for most commercial reactors having an average rating of approximately 1000 megawatts, and would weigh over 2500 tons if filled with concrete. Moreover, even if larger reactors could be moved in one piece, the capital cost of fabricating the necessary lifting equipment would likely make such an approach economically unfeasible.

SUMMARY

Systems and methods for dismantling a nuclear reactor are described. In one aspect the system includes a remotely controlled heavy manipulator ("manipulator") operatively coupled to a support structure and located in a contamination control enclosure, and a control station located in a non-contaminated portion of a workspace. The support structure provides the manipulator with top down access into a bioshield of a nuclear reactor. At least one computing device in the control station provides programmatic logic to perform operations including: (a) dismantling, using the manipulator, a graphite core (also referred to as a "graphite moderator"), concrete walls, and a ceiling of the bioshield, the manipulator being provided with automated access to all internal portions of the bioshield; (b) loading, using the manipulator, contaminated graphite blocks from the graphite moderator and rubblized concrete from the bioshield into one or more waste containers; and (c) dispersing, using the manipulator, dust suppression and contamination fixing spray to contaminated matter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

The systems and methods described herein relate to dismantling a nuclear reactor. A remotely controlled heavy manipulator (also referred to as an "excavator arm") is supported by a bridge and trolley system. A structural support system positions the bridge and trolley system at an appropriate elevation to allow dismantling of the associated nuclear reactor. The bridge moves on the structural support along a particular axis. The trolley moves on the bridge along an axis substantially perpendicular to the axis of movement of the bridge. The heavy manipulator is mounted on the trolley using a slewing bearing that permits the heavy manipulator to swing from side-to-side. The heavy manipulator can interface with various tools (a suite of tools), such as a hydraulic hammer, bucket and thumb, clamshell bucket, scrapper, hydraulic shear, dust suppression/contamination fixing spray equipment, and thermal cutting equipment. The described systems also include a gantry crane that moves a lifting fixture capable of supporting a waste sack into which waste materials and other demolition materials are loaded. Particular embodiments use waste containers deployed on rails to move waste sacks and other demolition materials.

The dismantling operations are performed inside a contamination control enclosure to prevent the spread of contaminated particles to the facility and the surrounding environment. The contamination control enclosure is supported by a structural frame that is part of the overall structural support system. The contamination control enclosure has a negative pressure provided by a filtered air mover system, which also maintains airflow in a particular direction to control dust and prevent the spread of contamination.

A control station located outside the contamination control enclosure allows an operator to control the dismantling equipment without being exposed to the contaminated materials. The control station includes one or more areas for monitoring the dismantling operation through cameras located near the reactor being dismantled. The control station also includes various control mechanisms, such as touch screen devices, joysticks and switches, to control the operation of equipment used in the dismantling operation.

Particular embodiments described herein perform a top down dismantling and removal of components from the top of the reactor bioshield. In alternate embodiments, the systems perform top down dismantling and removal of components from the side of the reactor bioshield.

An Exemplary System

Figure 1:
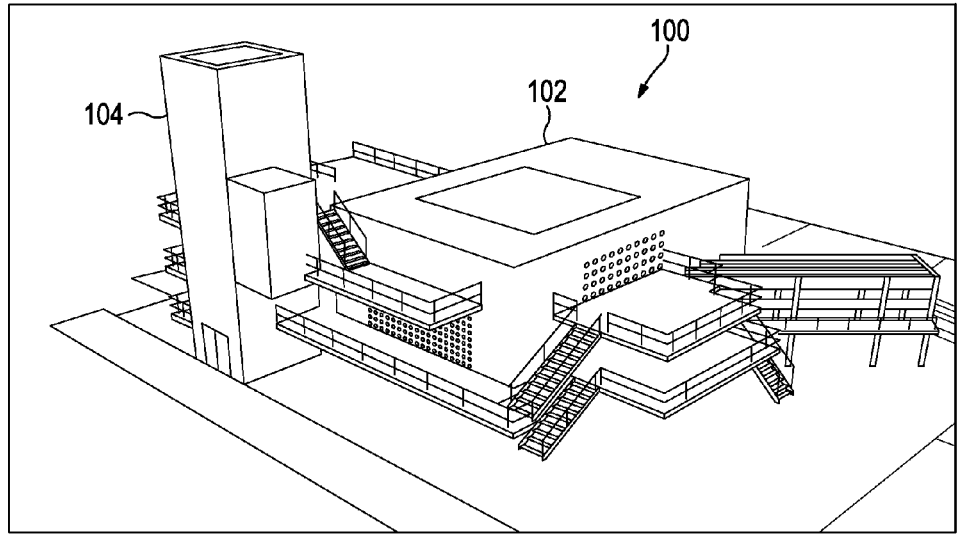
FIG. 1 illustrates an exemplary building encapsulating a graphite research reactor.

FIG. 1 illustrates an exemplary building 100 encapsulating a graphite research reactor. In the example of FIG. 1, a bioshield 102 is the central structure and measures approximately 55 feet long, 37.5 feet wide and 30 feet tall. Bioshield 102 also extends approximately three feet below the surrounding ground level. The walls and ceiling of bioshield 102 are approximately five feet thick. In a particular implementation, the walls and ceiling of bioshield 102 are constructed of a three inch thick exterior steel skin, a six inch thick interior steel skin and 4' 3" of high density concrete between the exterior steel skin and the interior steel skin. An elevator 104 provides access to multiple balconies positioned along the sides of bioshield 102.

Figure 2:
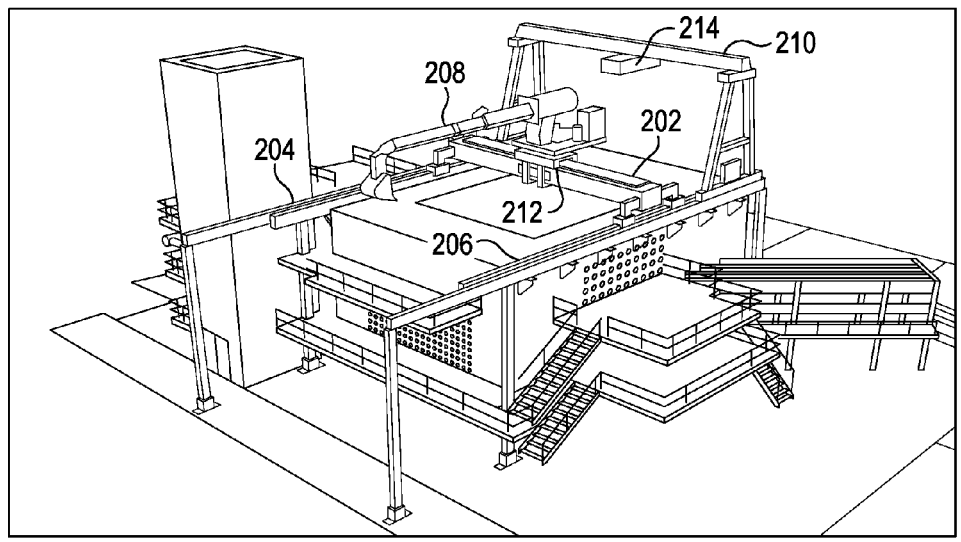
FIG. 2 illustrates an exemplary bridge-mounted excavator arm on a system for dismantling a nuclear reactor, according to one embodiment.

FIG. 2 illustrates an exemplary bridge-mounted excavator arm on a system for dismantling a nuclear reactor, according to one embodiment. A bridge 202 spans a distance between a pair of rails 204 and 206 positioned substantially parallel to one another. Rails 204 and 206 are also referred to as "runway girders." An excavator arm 208 is movably coupled to bridge 202. Excavator arm 208 is also referred to as a "heavy manipulator." One or more cameras attached to excavator arm 208 provide visual feedback to the operator of the dismantling system. In alternate embodiments, cameras are attached to other structural components and dismantling equipment to provide visual feedback to the operator regarding the area being dismantled. Excavator arm 208 includes multiple joints, such as a wrist rotate joint, arm pivot joint, arm rotate joint, forearm extend joint, and tool pitch joints.

Excavator arm 208 performs various tasks, such as lifting, rubblizing concrete and graphite, and excavation tasks associated with removal of the reactor components. The support structure described herein allows excavator arm 208 to access the internal components and internal surfaces of the bioshield. Excavator arm 208 is also capable of accessing areas adjacent the bioshield to perform testing procedures, maintenance, and load material into one or more waste containers.

Bridge 202 is configured to slide, roll or otherwise move along rails 204 and 206 to adjust the position of excavator arm 208 relative to the bioshield. In a particular embodiment, bridge 202 includes one or more motors to move the bridge along rails 204 and 206. Bridge 202 includes a bridge trolley 212 that moves substantially perpendicular to the movement of the bridge. Excavator arm 208 is connected to bridge trolley 212, which also includes one or more motors that allow the trolley to move along bridge 202. The two axes of motion provided by bridge 202 and bridge trolley 212 allow excavator arm 208 to reach all areas of the bioshield necessary for dismantling the reactor.

In a particular implementation, excavator arm 208 removes the graphite core (also referred to as a "graphite moderator") from the bioshield and loads it into one or more containers, such as waste sacks. After removing the graphite core, excavator arm 208 is used to rubblize the concrete in the walls and ceiling of the bioshield. Excavator arm 208 is further used to package the rubblized concrete into one or more containers.

In a particular implementation, waste carts are provided that move along tracks or rails. The waste carts are winched or driven in and out of the waste loading area on the tracks/rails. Movement of the waste carts is controlled from a remote location outside the contamination control enclosure.

Excavator arm 208 is powered by one of two hydraulic skid systems. A primary skid system provides power to allow full operation of all functions and features of excavator arm 208 at full speed. The secondary skid system provides flow and pressure to recover the equipment from the work area in the event of a failure of the primary skid system. The hydraulic skid systems include pumps, motors, oil reservoirs, and valves needed to power the equipment. In a particular embodiment, the hydraulic skid systems are located near the control station. The hydraulic skid systems are located outside the contamination control enclosure to facilitate repair and maintenance. In other embodiments, the hydraulic skid systems are located on excavator arm 208. Flow meters are used to monitor and limit the flow of hydraulic fluid into the contaminated area. The signals from these flow meters are also monitored to detect leaks in the hydraulic system. The hydraulic system automatically shuts down if the ratio of the flows to and from a hydraulic valve bank is outside a predetermined operating range.

As discussed herein, particular embodiments also include a gantry crane 210 to assist with the removal of plugs from the roof of the bioshield to expose the graphite core. Gantry crane 210 is also used to move equipment and other objects, such as sacks of graphite material from inside the bioshield to one or more waste containers located outside the bioshield. A load cell associated with a crane trolley 214 determines a weight associated with waste containers to prevent overloading of the waste containers.

Figure 3:
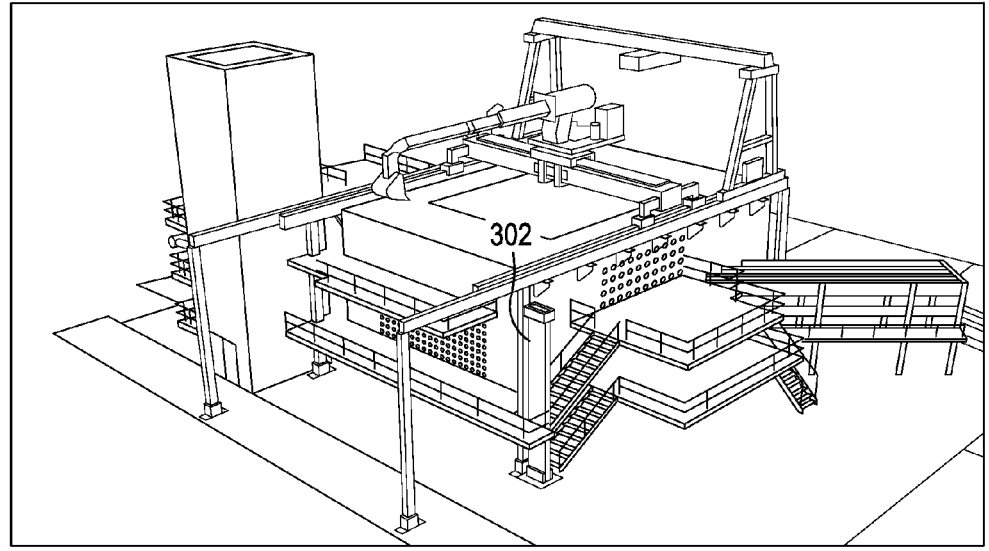
FIG. 3 shows an exemplary freestanding support structure for a system to dismantle a nuclear reactor, according to one embodiment.

FIG. 3 shows an exemplary freestanding support structure for a system to dismantle a nuclear reactor, according to one embodiment. The embodiment shown in FIG. 3 (and additional figures below) is a freestanding structure that is independent of the bioshield, containing four vertical column supports. One such column 302 is shown in FIG. 3. Column 302 resists the vertical and horizontal loads transmitted through runway girders, discussed below.

Figure 4:
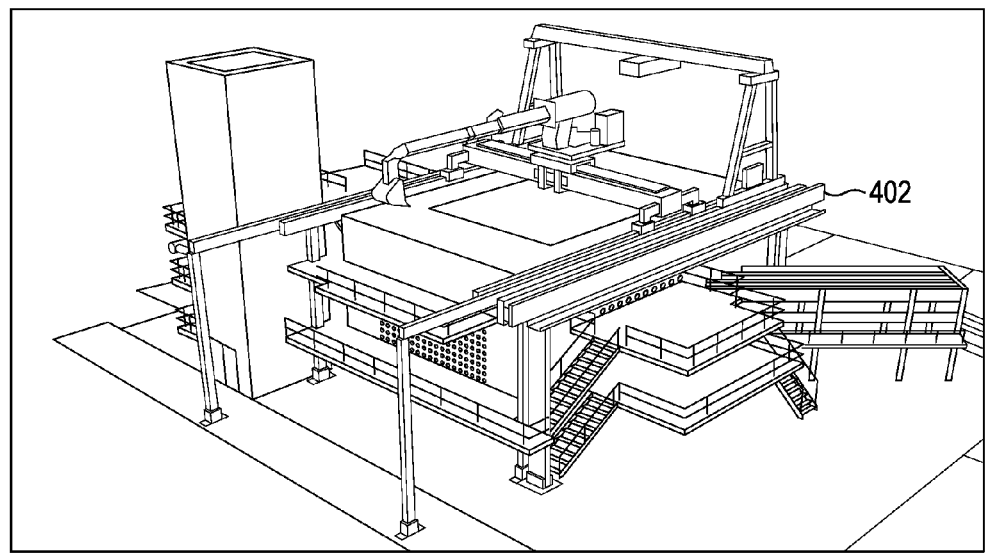
FIG. 4 shows an exemplary runway girder assembly, according to one embodiment.

FIG. 4 shows an exemplary runway girder assembly 402, according to one embodiment. As shown in FIG. 4, runway girder assembly 402 is supported at one end by column 302. Runway girder assembly 402 has a box structure to provide both vertical and lateral stiffness across the length of the runway girder. In a particular embodiment, runway girder assembly 402 includes an integrated walkway on the inboard side to allow personnel to access other components of the dismantling structure. Runway girder assembly 402 may also include a deck on the outboard side to allow mounting of other components/structures and for positioning cable carriers that house a hose and wiring providing power and control to the dismantling equipment.

Figure 5:
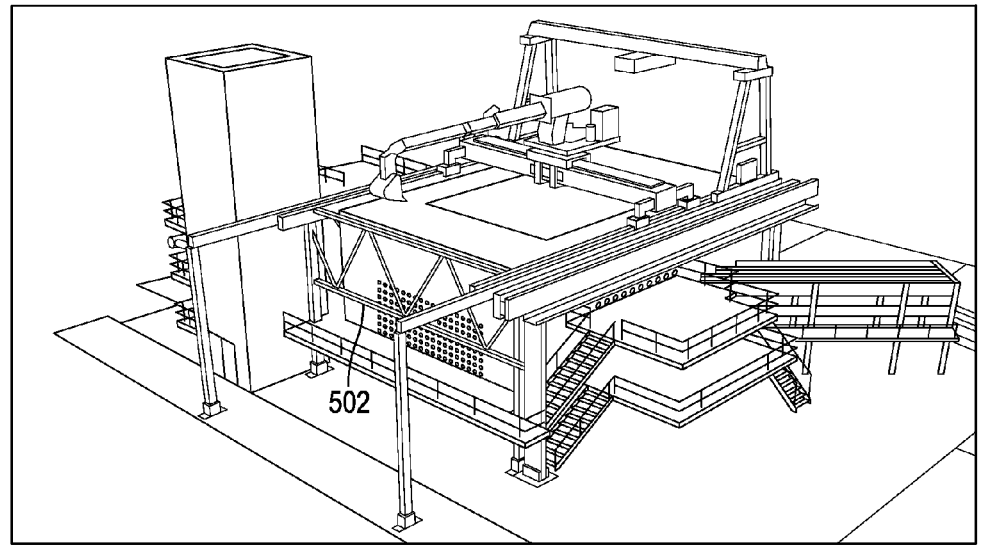
FIG. 5 shows an exemplary location of trusses to enhance the system's ability to resist lateral loads, according to one embodiment.

FIG. 5 shows an exemplary location of a truss 502 to enhance the system's ability to resist lateral loads, according to one embodiment. As discussed below, the dismantling structure includes multiple trusses. Truss 502 spans between opposite sides of the dismantling structure.

Figure 6:
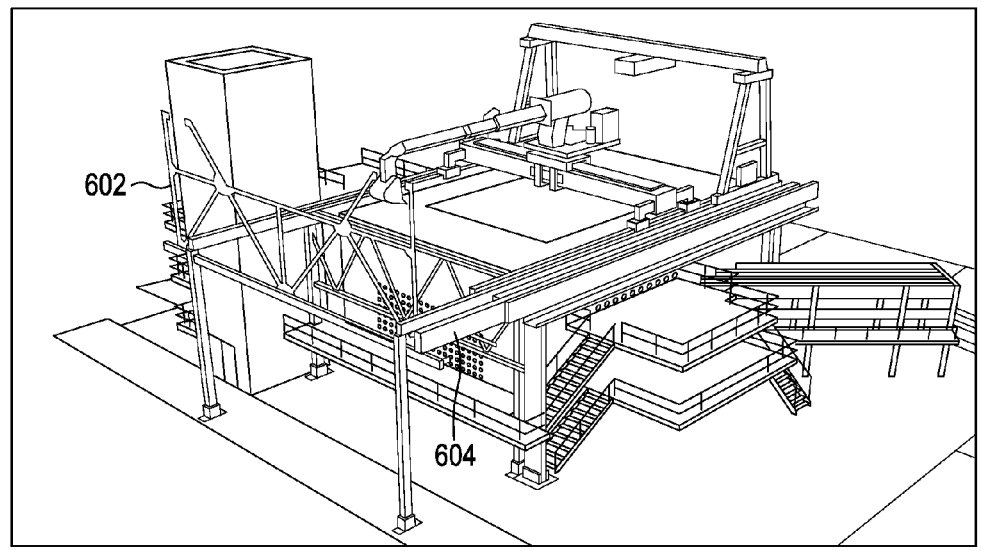
FIG. 6 shows an exemplary aspect of a runway girder for crane operation, according to one embodiment.

FIG. 6 shows an exemplary aspect of a runway girder for crane operation, according to one embodiment. A runway girder extension 604 is added to runway girder assembly 402 (FIG. 4) to allow for extended operation and positioning of a bridge, a crane or an excavator. In a particular embodiment, runway girder extension 604 is removable from runway girder assembly 402. A truss 602 provides structural support for the dismantling structure, including runway girder extension 604.

Figure 7:
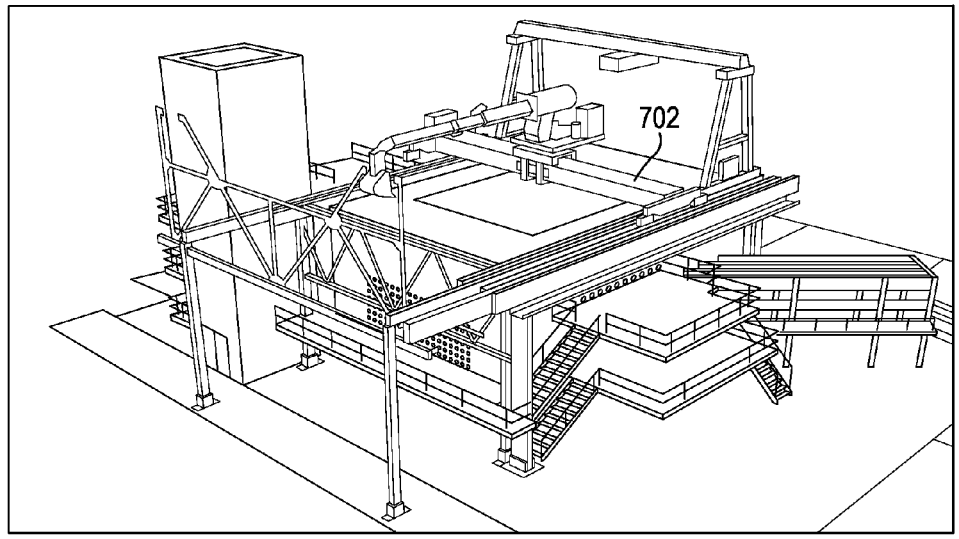
FIG. 7 shows aspects of an exemplary excavator bridge on the systems support structure, according to one embodiment.

FIG. 7 shows aspects of an exemplary excavator bridge 702 on the systems support structure, according to one embodiment. One end of excavator bridge 702 moves along runway girder assembly 402. The opposite end of excavator bridge 702 moves along another runway girder assembly, discussed below.

Figure 8:
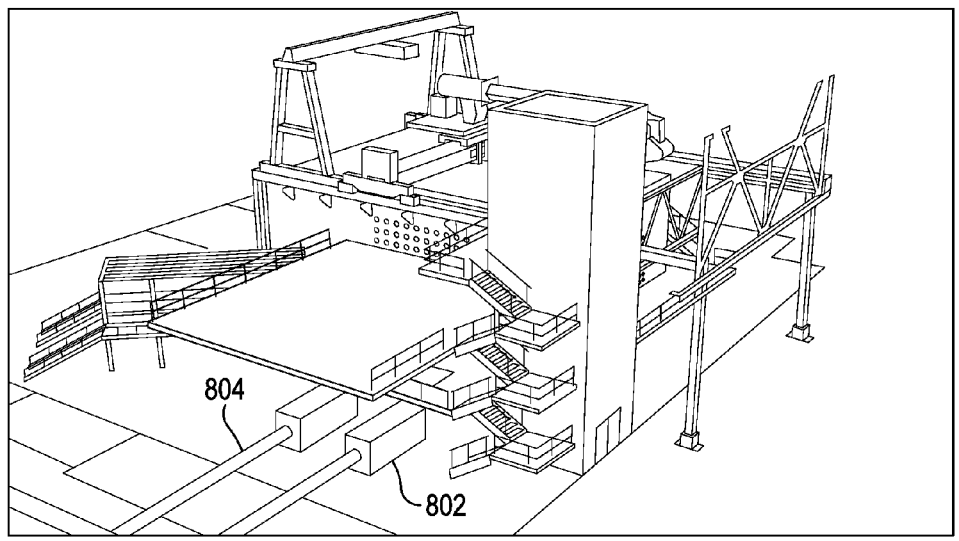
FIG. 8 illustrates another exemplary view of a bioshield, according to one embodiment.

FIG. 8 illustrates another exemplary view of a bioshield, according to one embodiment. FIG. 8 shows two HEPA (high efficiency particulate air) filter units 802 and 804 associated with the ventilation system. HEPA filter units 802 and 804 filter air as it is drawn out of the boundary/enclosure provided by the bioshield and contamination control enclosure.

Figure 9:
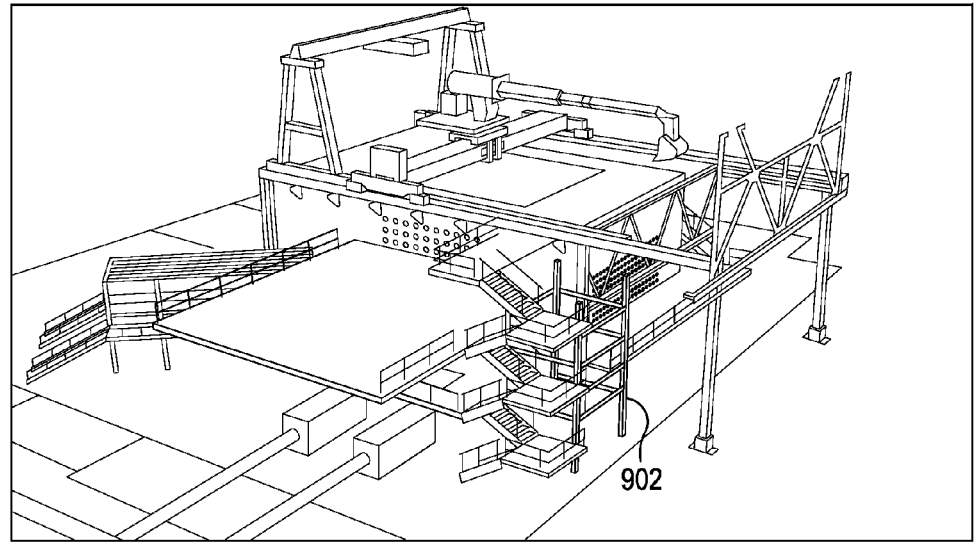
FIG. 9 shows exemplary use of elevator shaft framing to provide support to structure of the system, according to one embodiment.

FIG. 9 shows exemplary use of elevator shaft framing 902 to provide support to structure of the system, according to one embodiment. A portion of elevator shaft 104 (FIG. 1) was removed to expose elevator shaft framing 902.

Figure 10:
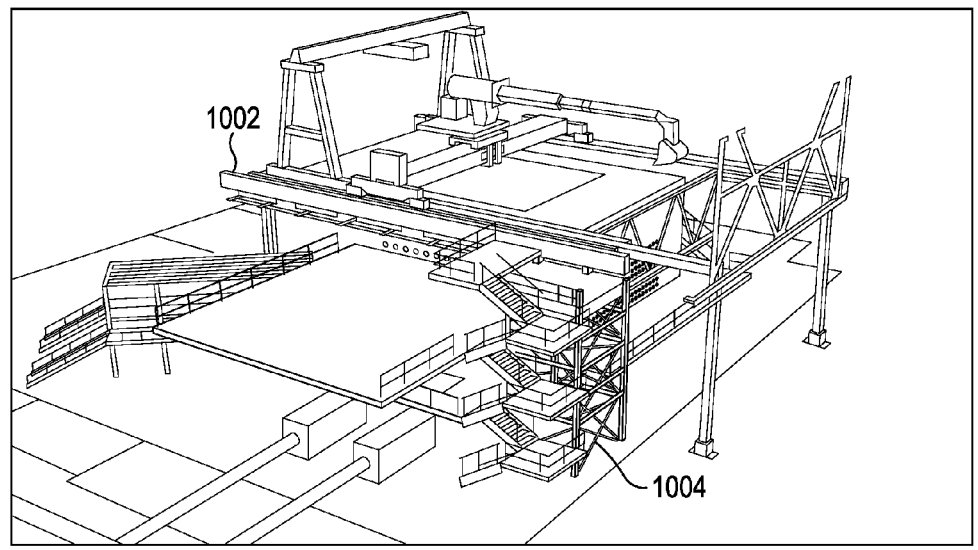
FIG. 10 shows exemplary diagonal bracing and an observation deck associated with the system's support structure, according to one embodiment.

FIG. 10 shows exemplary diagonal bracing 1004 and an observation deck associated with the system's support structure, according to one embodiment. Diagonal bracing 1004 is used to reinforce the elevator shaft framing 902 discussed with respect to FIG. 9. A runway girder assembly 1002 is at least partially supported at one end by the elevator shaft reinforced by the diagonal bracing 1004. Diagonal bracing 1004 provides resistance to both lateral and longitudinal loads generated by the dismantling structure and equipment associated with the dismantling structure.

Figure 11:
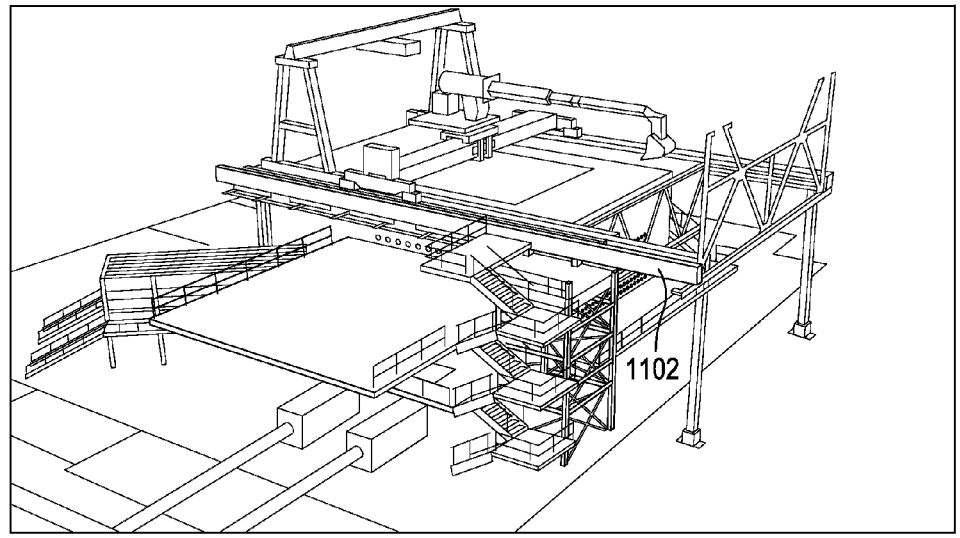
FIG. 11 shows an exemplary runway girder extension providing substantially unencumbered movement of system components during installation, according to one embodiment.

FIG. 11 shows an exemplary runway girder extension 1102 providing substantially unencumbered movement of system components during installation, according to one embodiment. Runway girder extension 1102 is similar to runway girder extension 604 discussed above with respect to FIG. 6. Runway girder extension 1102 provides for extended operation and positioning of a bridge, a crane or an excavator. In a particular embodiment, runway girder extension 1102 is removable from runway girder assembly 1002.

Figure 12:
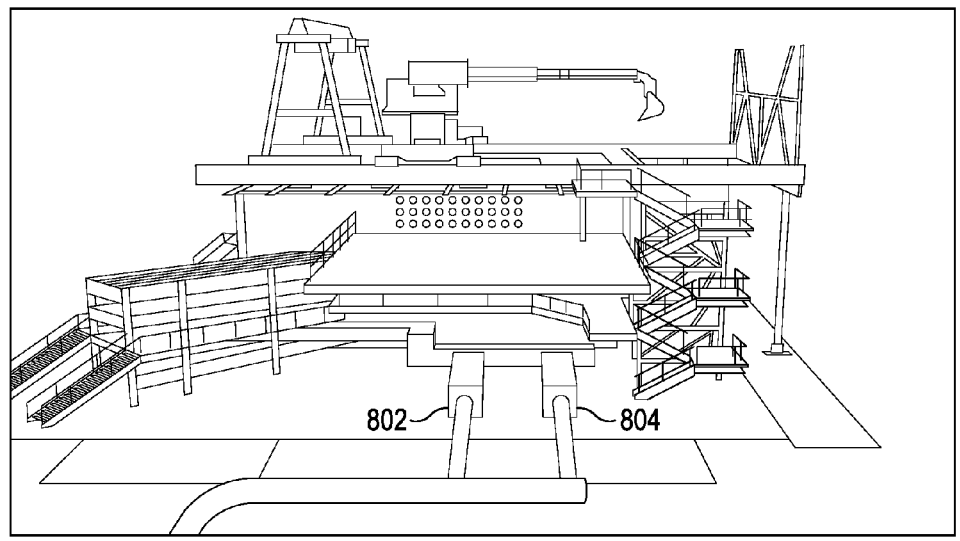
FIG. 12 shows an exemplary view of a bioshield having two HEPA filter units, according to one embodiment.

FIG. 12 shows an exemplary view of a bioshield having two HEPA filter units 802 and 804, according to one embodiment. HEPA filter units 802 and 804 are also shown in FIG. 8.

Figure 13:
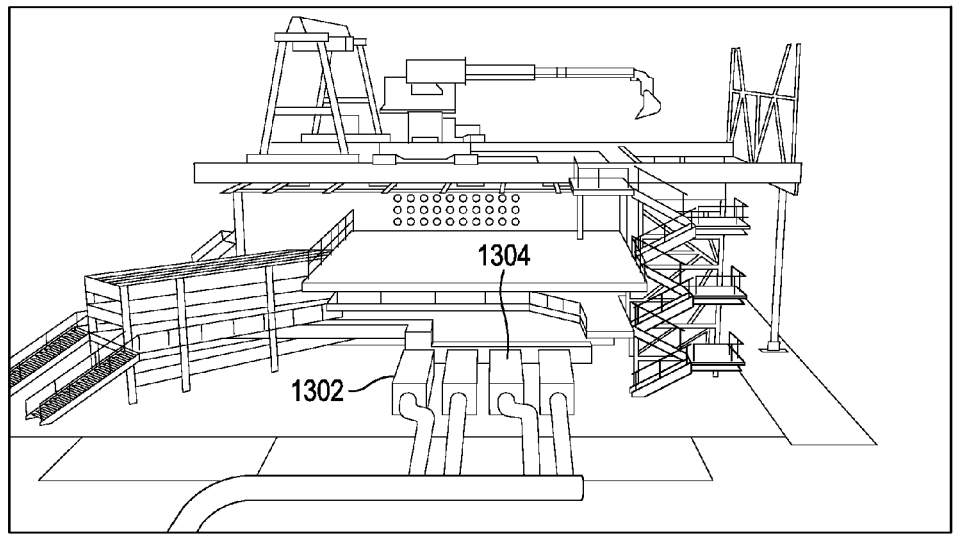
FIG. 13 shows exemplary aspects of system filtration units, according to one embodiment.

FIG. 13 shows exemplary aspects of system filtration units, according to one embodiment. The embodiment of FIG. 13 shows two additional HEPA filter units 1302 and 1304. HEPA filter units 1302 and 1304 operate in combination with HEPA filter units 802 and 804 (FIG. 8) to provide additional air filtering capability. The addition of HEPA filter units 1302 and 1304 also provide redundant air filtering equipment in case of equipment maintenance or equipment failure.

Figure 14:
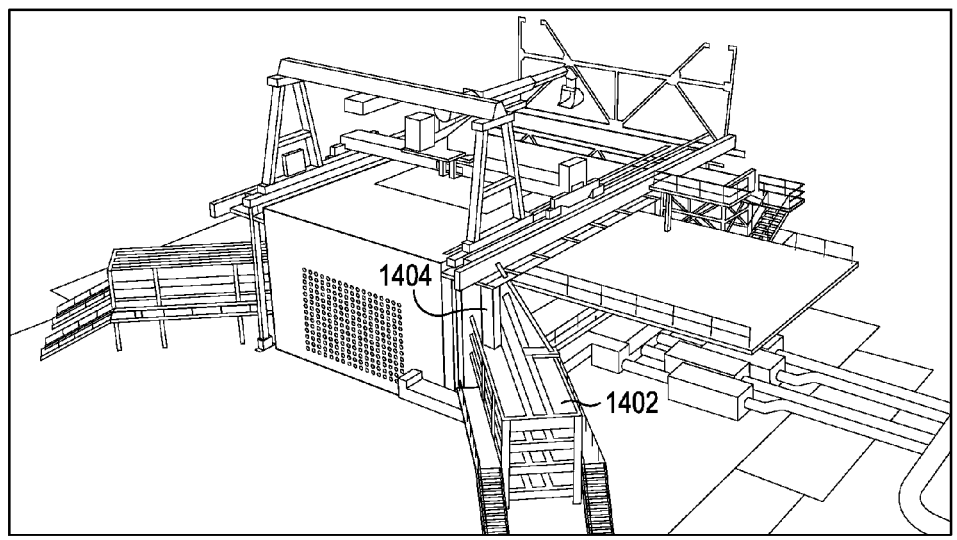
FIG. 14 shows an exemplary view of a bioshield, according to one embodiment.

FIG. 14 shows an exemplary view of a bioshield, according to one embodiment. The embodiment of FIG. 14 includes a CRDM (Control Rod Drive Mechanism) structure 1402 that provides control of various operations associated with the bioshield. A support column 1404 shown in FIG. 14 provides support for additional structural components discussed below.

Figure 15:
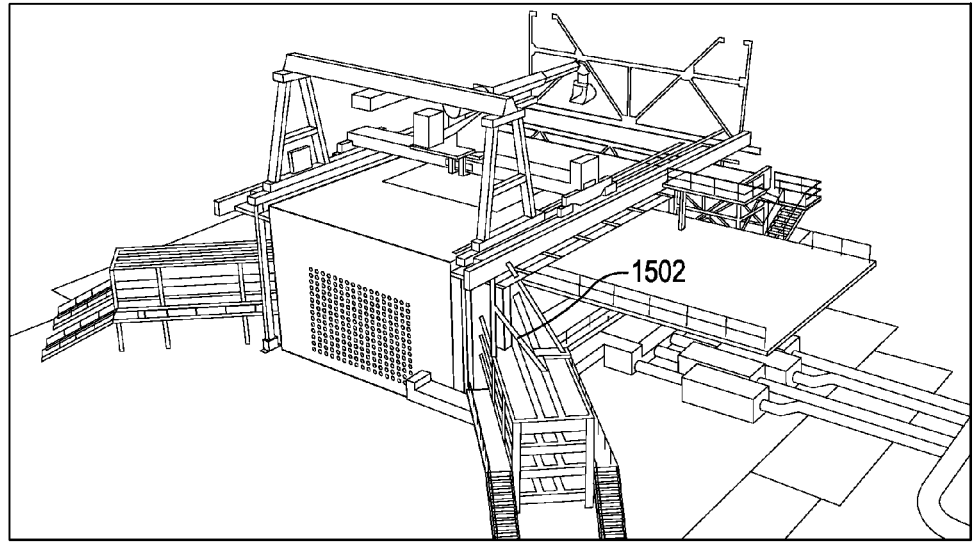
FIG. 15 shows aspects of additional support modifications to the system structure, according to one embodiment.

FIG. 15 shows aspects of additional support modifications to the system structure, according to one embodiment. In particular, additional bracing 1502 is included to provide additional support for the dismantling structure.

Figure 16:
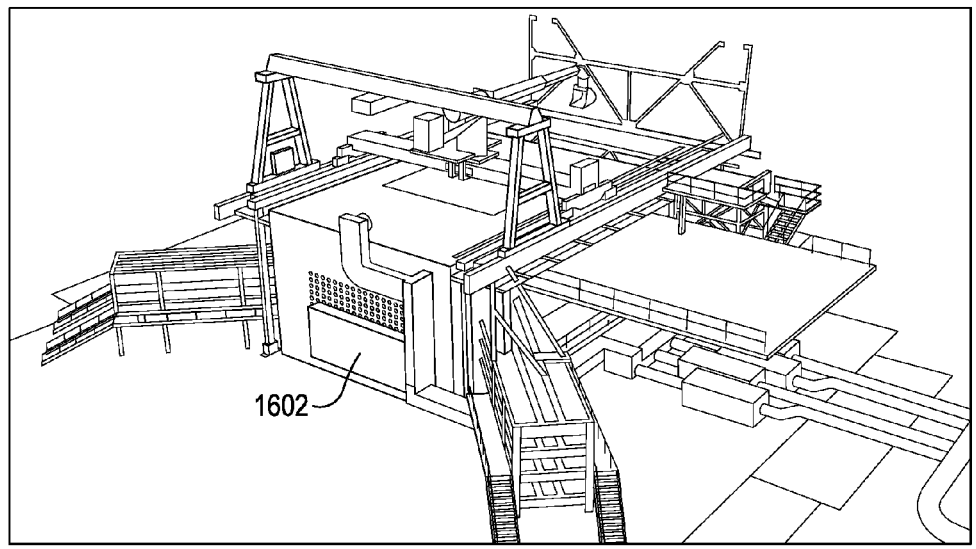
FIG. 16 shows exemplary aspects of an exhaust Plenum system, according to one embodiment.

FIG. 16 shows exemplary aspects of an exhaust plenum system 1602, according to one embodiment. Exhaust plenum system 1602 covers fuel channel openings in the bioshield and provides air flow through the contamination control enclosure. The exhaust plenum system 1602 is designed to produce an air flow that captures all airborne particles generated during the core removal process and draws the airborne particles into the bioshield. Drawing airborne particles into the bioshield protects operations personnel from exposure to airborne contamination and prevents contamination of the work surfaces above and surrounding the bioshield. Exhaust plenum system 1602 includes a duct that extends to the top of the bioshield to provide negative pressure in the contamination control enclosure prior to creating access to the bioshield (e.g., removal of the ceiling plugs in the bioshield, and/or so on).

Figure 17:
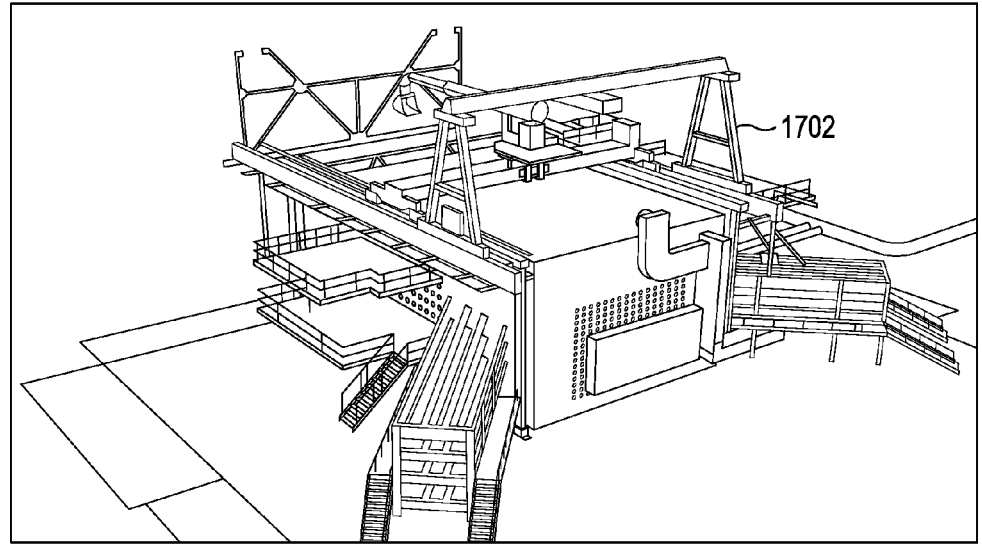
FIG. 17 shows exemplary aspects of a bioshield and crane width, according to one embodiment.
Figure 18:
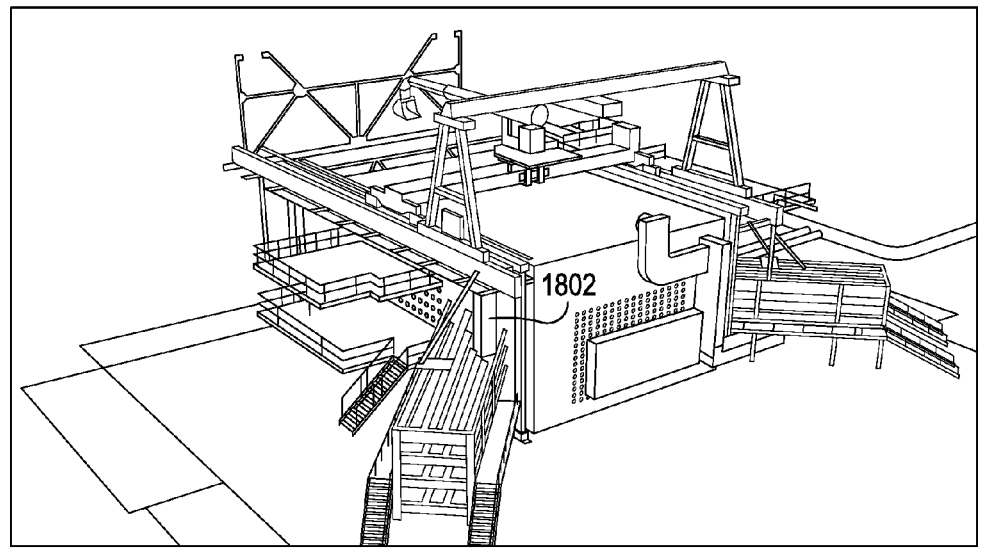
FIG. 18 shows exemplary aspects of the support structure, according to one embodiment.

FIG. 17 shows exemplary aspects of a bioshield including an extended crane width, according to one embodiment. A crane 1702 has extended width based on mounting the crane to runway girder assemblies 402 and 1002. FIG. 18 shows exemplary aspects of the support structure, according to one embodiment. A vertical support column 1802 provides support for various components of the dismantling structure.

Figure 19:
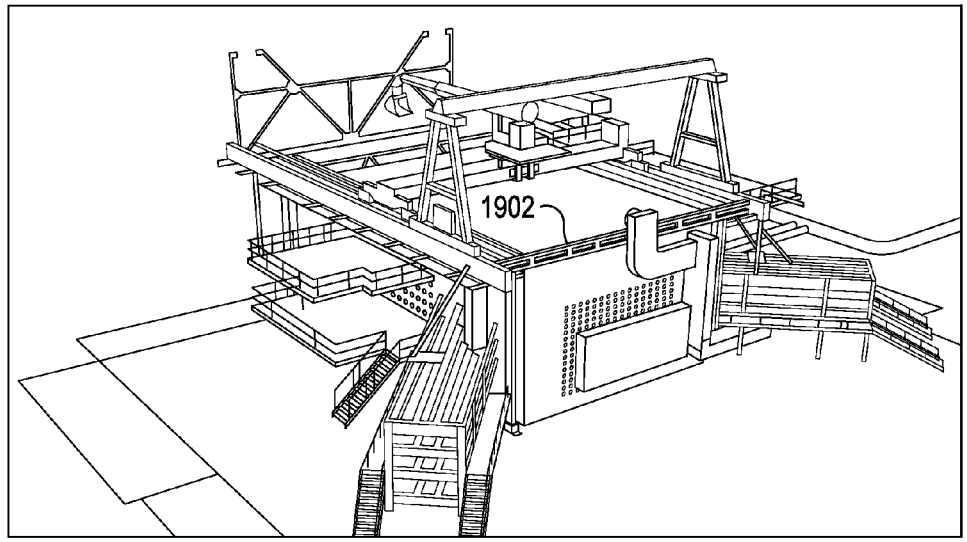
FIG. 19 shows further exemplary aspects of the support structure, according to one embodiment.
Figure 20:
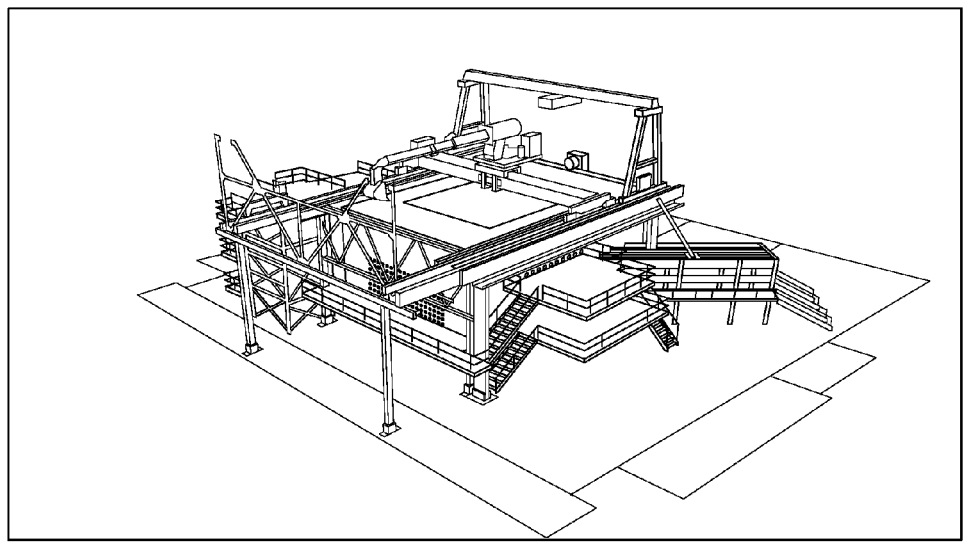
FIG. 20 shows the completed support/dismantling structure, according to one embodiment.

FIG. 19 shows further exemplary aspects of the support structure, according to one embodiment. A truss 1902 extends between runway girder assemblies 4002 and 1002 to provide additional support for the dismantling structure. FIG. 20 shows the completed support/dismantling structure, according to one embodiment.

Figure 21:
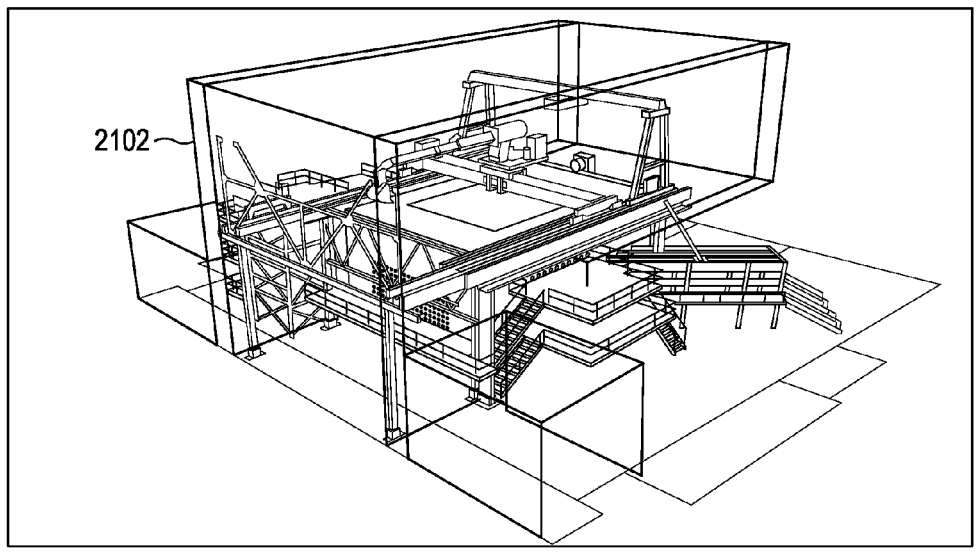
FIG. 21 shows aspects of an exemplary contamination control enclosure, according to one embodiment.

FIG. 21 shows aspects of an exemplary contamination control enclosure 2102, according to one embodiment. In a particular embodiment, contamination control enclosure 2102 is a plastic walled containment that encompasses the entire work volume of the dismantling structure. In a particular embodiment, contamination control enclosure 2102 is fabricated from polyester-reinforced PVC (polyvinyl chloride). Contamination control enclosure 2102 includes portions that surround the work area that houses the excavator and the crane, and areas where containers are loaded with waste material. One or more airlocks are provided to allow entry and exit of waste containers and equipment while maintaining a barrier between the contaminated work areas and the non-contaminated work areas.

The ventilation system works with the contamination control enclosure 2102 to define a desired air flow path through the system. Generally, air flows from areas of no contamination (e.g., the areas outside of contamination control enclosure 2102) to areas of high contamination (e.g., the areas with the waste containers and openings in the top of the bioshield). This air flow prevents contaminants from entering non-contaminated areas. In a particular implementation, contamination control enclosure 2102 has a volume of approximately 242,000 cubic feet. In this implementation, four HEPA filter units (802, 804, 1302, and 1304) provide a total air volume movement of 24,000 cubic feet per minute.

An Exemplary Procedure

Figure 22:
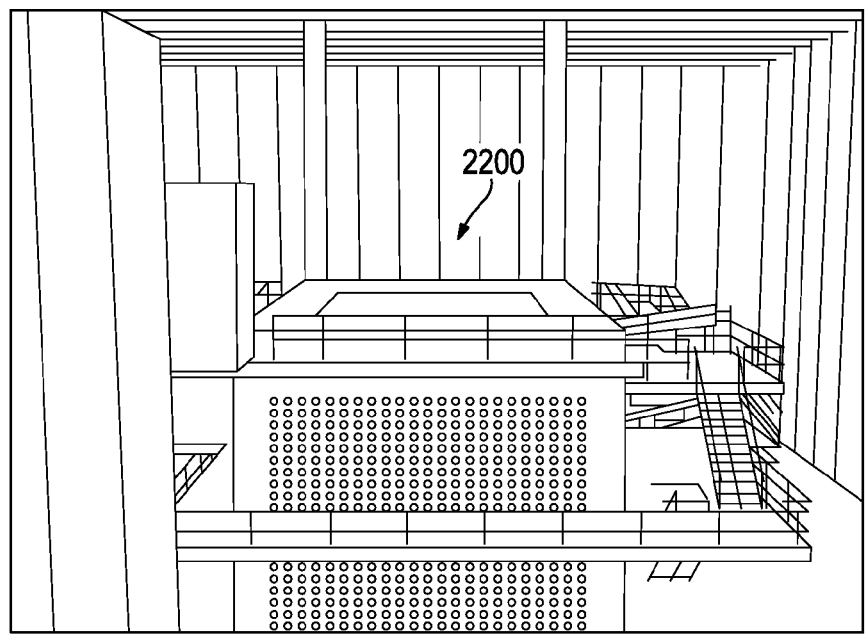
FIG. 22 shows an exemplary environment including a bioshield of a graphite-moderated nuclear reactor, according to one embodiment.
Figure 23:
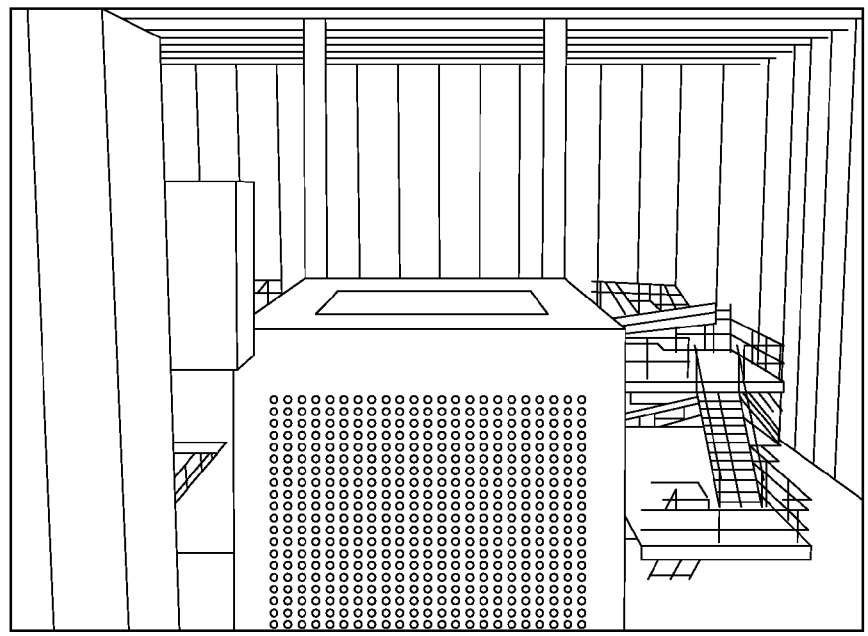
FIG. 23 shows the environment of FIG. 22 after removing balconies from the bioshield, according to one embodiment.

FIG. 22 shows an exemplary environment including a bioshield 2200 of a graphite-moderated nuclear reactor, according to one embodiment. FIG. 23 shows the environment of FIG. 22 after removing balconies from the bioshield, according to one embodiment. The balconies are removed, for example, to permit movement of materials from the bioshield to one or more containers located below the former location of the balconies. In addition to removing the balconies, portions of the elevator shaft and related components are removed, as discussed above.

Figure 24:
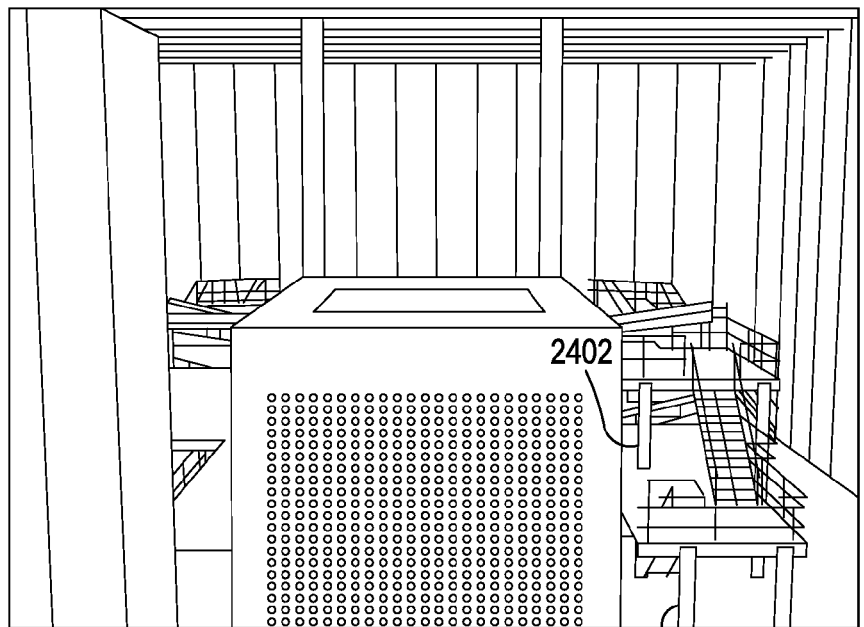
FIGS. 24 and 25 show exemplary aspects of support columns installed near the bioshield, according to one embodiment.

FIG. 24 shows exemplary aspects of support columns 2402 installed near the bioshield, according to one embodiment. In this embodiment, support columns 2402 are supporting certain balconies and walkways adjacent the bioshield. Support columns 2402 provide additional support for the balconies after removal of the bioshield.

Figure 25:
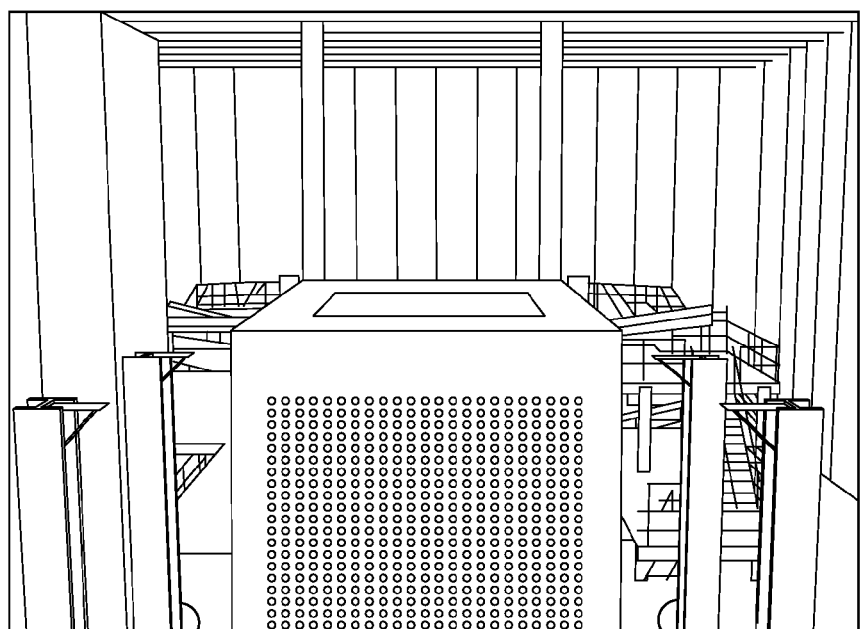

FIG. 25 shows exemplary aspects of support columns 2502 installed near the bioshield, according to one embodiment. In this embodiment, support columns 2502 will support other components and systems of the dismantling structure discussed herein.

Figure 26:
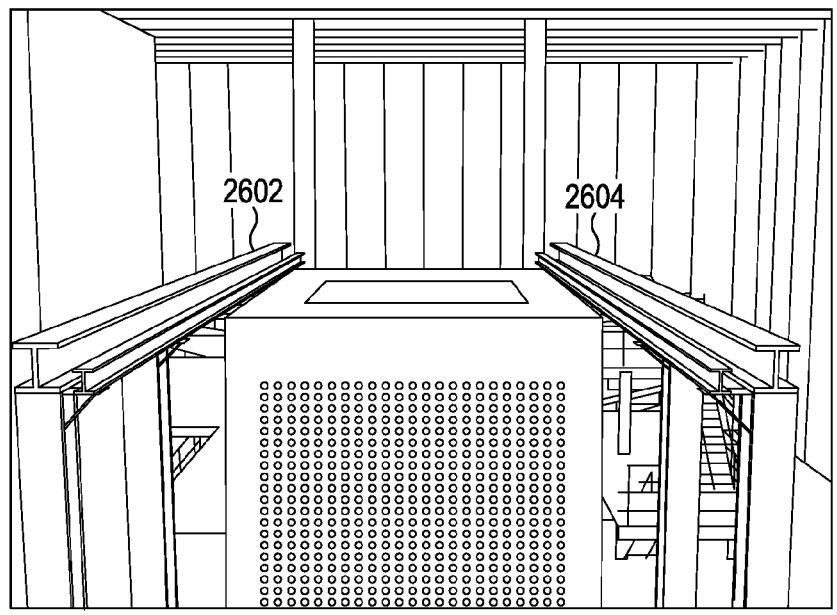
FIG. 26 shows exemplary aspects of runway girders, according to one embodiment.

FIG. 26 shows exemplary aspects of runway girders 2602 and 2604, according to one embodiment. Runway girders 2602 and 2604 support a crane, bridge and other components used in the dismantling of the bioshield. As discussed above, runway girders 2602 and 2604 have a box structure that provides strength in both the vertical and lateral directions.

Figure 27:
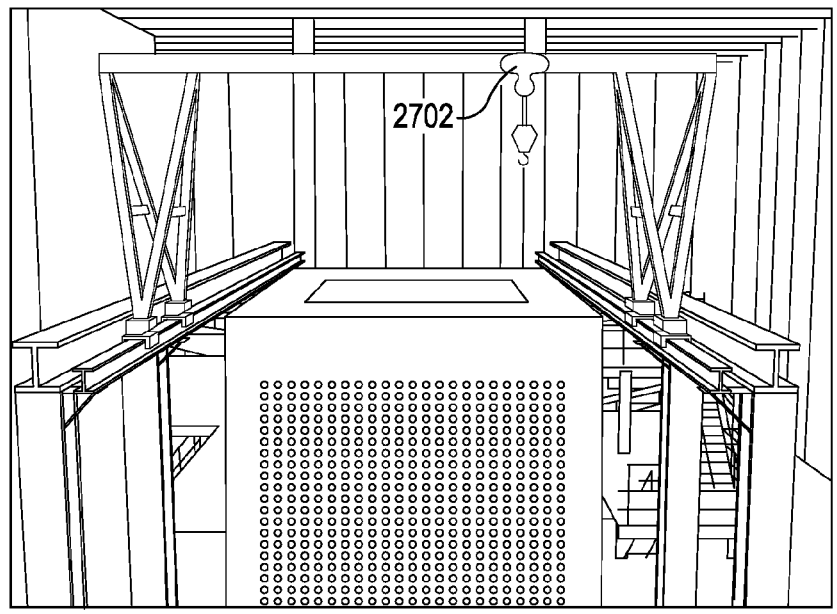
FIG. 27 shows exemplary aspects of a gantry crane installed on the runway girders, according to one embodiment.

FIG. 27 shows exemplary aspects of a gantry crane 2702 installed on the runway girders, according to one embodiment. Gantry crane 2702 is controlled from a location remote from the bioshield, and is used to lift waste in sacks that are retained and supported by a specially designed lift fixture and places them into steel waste containers at the floor level. In other implementations, gantry crane 2702 lifts other containers from the core of the bioshield and places them into containers at the floor level. Gantry crane 2702 is also useful in lifting the plugs from the bioshield roof to expose the core materials. Additionally, gantry crane 2702 is capable of deploying equipment used in the demolition of the bioshield walls and roof. Gantry crane 2702 can also support maintenance and provide emergency recovery of equipment used in the dismantling process.

Figure 28:
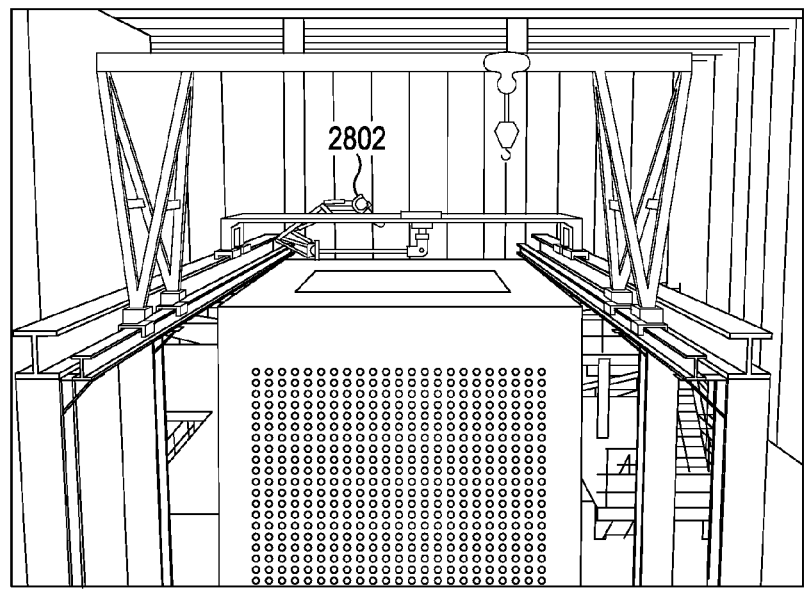
FIG. 28 shows exemplary aspects of a gantry-mounted arm, according to one embodiment.

FIG. 28 shows exemplary aspects of a gantry-mounted arm 2802, according to one embodiment. Gantry-mounted arm 2802 is capable of positioning various core and bioshield removal equipment.

Figure 29:
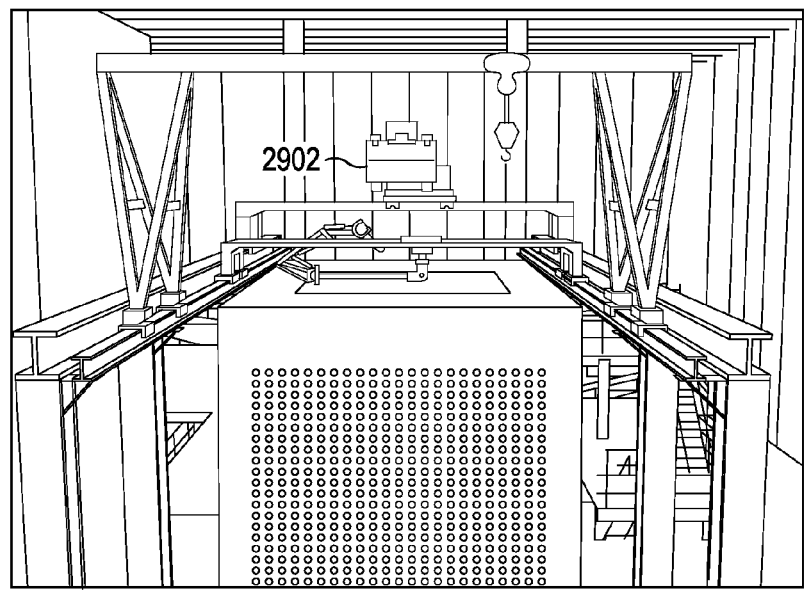
FIG. 29 shows exemplary aspects of an excavator arm, according to one embodiment.

FIG. 29 shows exemplary aspects of an excavator arm 2902, according to one embodiment. In this embodiment, excavator arm 2902 is mounted to a gantry trolley and bridge. In a particular embodiment, the gantry trolley and bridge use the same runway girders as gantry-mounted arm 2802. Excavator arm 2902 is mounted in a manner that permits the following movements:

movement as the bridge moves on the runway girders,
movement on the trolley,
rotating on an axis centered on the bridge (swing),
tipping down into the bioshield (hoist),
rotating the excavator arm along its long axis (tilt),
telescoping in and out to reach material (extend/retract),
vertical movement of tools at the end of the arm (open/close), and
lateral movement of the tool at the end of the arm (powertilt).

Excavator arm 2902 includes several tools and controls that perform various tasks during core and bioshield removal. These tools include:

a bucket with powered thumb for digging and grabbing graphite and bioshield materials,
a shear used to size reduce in-core components such as graphite, control rods, invar bars and experiments,
a hydraulic breaker hammer that can rubblize concrete and graphite, and separate welded steel members,
a grapple for rapid removal of graphite blocks,
a vacuum to collect loose debris that remains at the completion of core and bioshield removal,
an arm extension that provides additional reach for the excavator arm,
spray equipment for the application of dust suppressant and fixative coatings, and
various thermal and mechanical cutting tools for size reduction of the bioshield steel and other components.

During a reactor removal/dismantling project, a primary goal is removal of the core in a manner that avoids release of any contaminated material into the surrounding environment. Another goal of a reactor removal/dismantling project is the removal of the bioshield itself. When reactors were originally designed and constructed, they were intended to protect the operators. These reactors were not designed with provisions for future removal. As discussed above, bioshield walls and ceilings are typically five feet thick. Excavator arm 2902, through the use of one or more tools, is capable of reduce the size of the bioshield components and remove those components.

Figure 30:
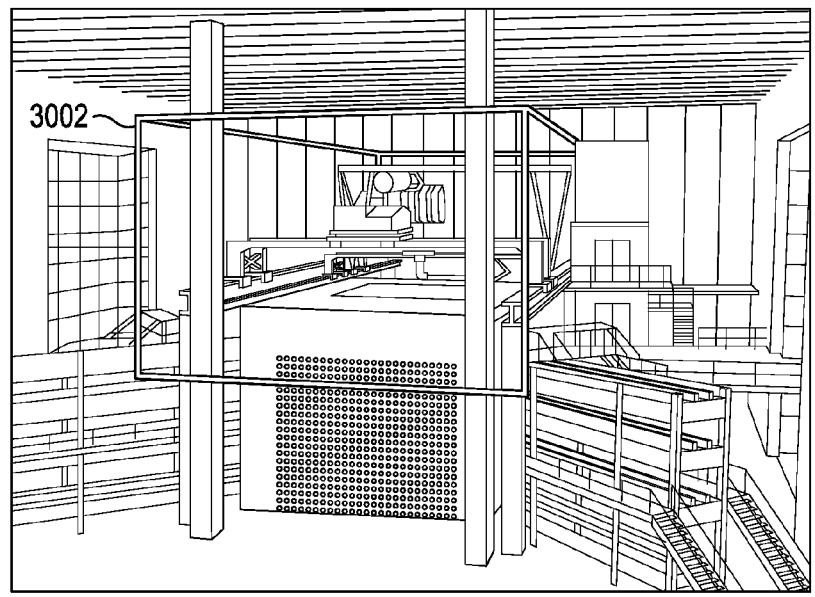
FIG. 30 shows exemplary aspects of a contamination control enclosure, according to one embodiment.

Operation of excavator arm 2902 and other components and systems may generate airborne contamination during the removal/dismantling process. FIG. 30 shows exemplary aspects of a contamination control enclosure 3002, according to one embodiment. Contamination control enclosure 3002 prevents the distribution of airborne contamination outside the enclosed area. The size of contamination control enclosure 3002 is adequate to cover all of the equipment installed above the bioshield.

Figure 31:
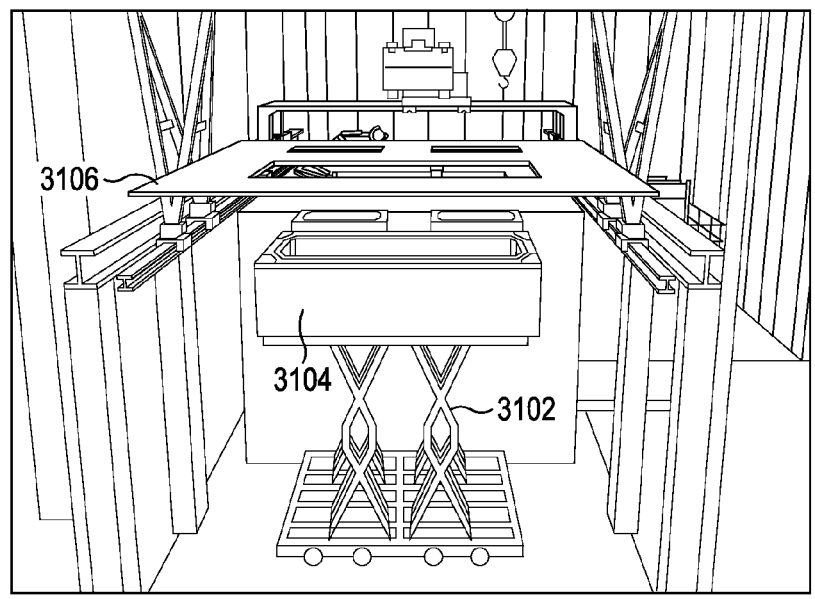
FIG. 31 shows exemplary aspects of waste containers used during the dismantling process, according to one embodiment.

FIG. 31 shows exemplary aspects of waste containers used during the dismantling process, according to one embodiment. In particular, FIG. 31 shows a lift table 3102 capable of raising and lowering a container 3104 supported by the lift table. A barrier floor 3106 contains at least one aperture configured to receive at least a portion of container 3104. FIG. 31 shows container 3104 raised to the proper operating height. In a particular embodiment, container 3104 is raised to a level where the top of container 3104 is substantially coplanar with the top of the bioshield. Barrier floor 3106 prevents contamination of the area below the barrier floor and below lift table 3102.

Figure 32:
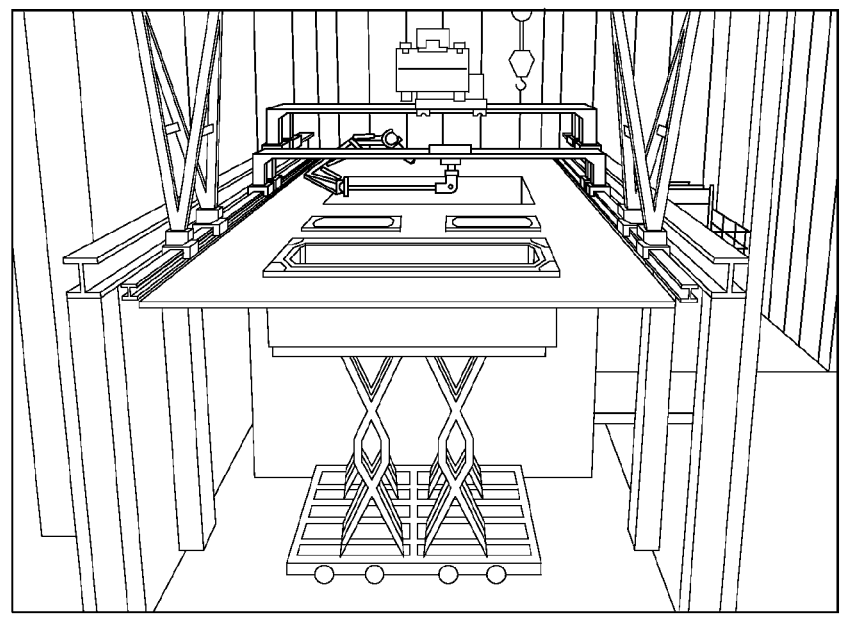
FIG. 32 shows an exemplary embodiment in which the barrier floor is positioned over the opening of the waste container.

FIG. 32 shows an exemplary embodiment in which barrier floor 3106 is positioned over the opening of container 3104. In a particular implementation, the positioning of container 3104 and barrier floor 3106 in FIG. 32 is the starting position of these components at the beginning of the removal/dismantling process.

Figure 33:
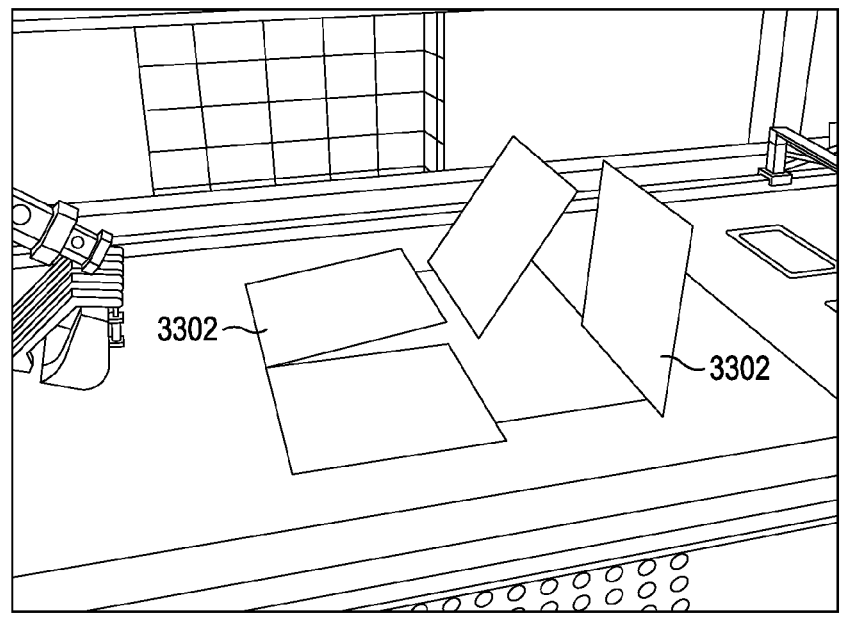
FIG. 33 shows exemplary aspects of removing bioshield protective covers, according to one embodiment.

FIG. 33 shows exemplary aspects of removing bioshield shield plugs and protective covers 3302, according to one embodiment. An initial step in exposing the reactor core is removal of protective covers 3302 (also referred to as "cover plates") from the bioshield. Protective covers 3302 are positioned over multiple bioshield ceiling plugs. The protective covers 3302 are removed using, for example, the gantry crane discussed herein.

Figure 34:
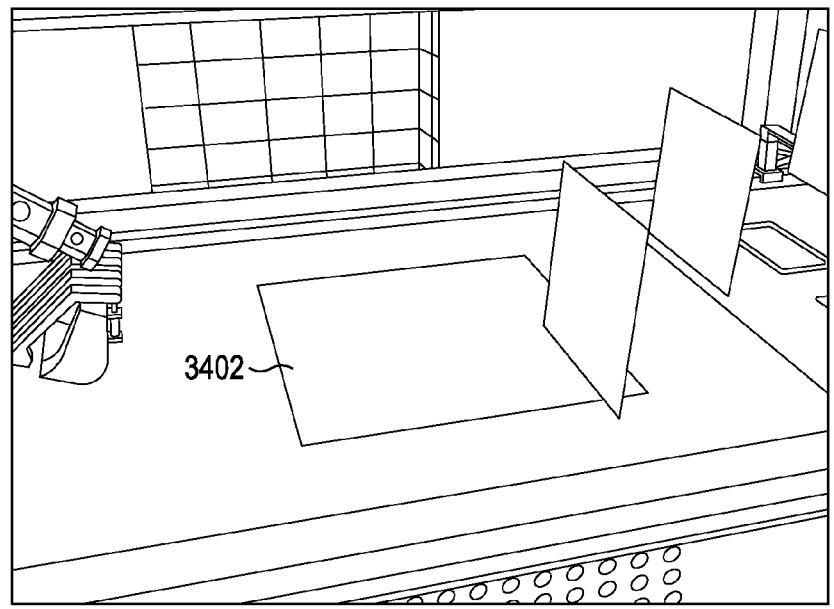
FIG. 34 shows the top layer of the bioshield after removal of the bioshield protective covers, according to one embodiment.

FIG. 34 shows the top layer 3402 of the bioshield after removal of the bioshield protective covers, according to one embodiment. In a particular embodiment, top layer 3402 is the top layer of the ceiling plugs of the bioshield.

Figure 35:
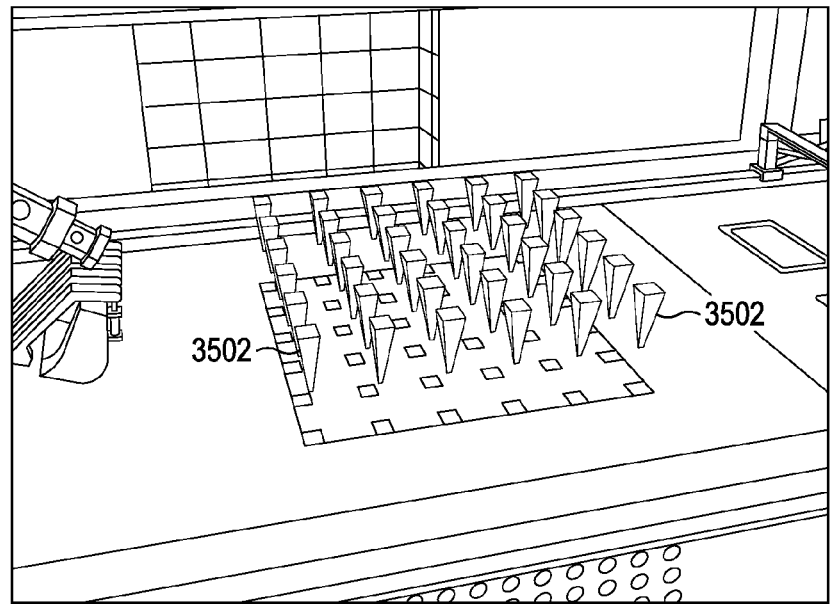
FIG. 35 shows exemplary aspects of the bioshield ceiling plugs, according to one embodiment.

FIG. 35 shows exemplary aspects of the bioshield ceiling plugs 3502, according to one embodiment. Ceiling plugs 3502 have integral lift eyes that allow the plugs to be lifted from the bioshield. In a particular implementation, a sling is attached to the lift eyes and ceiling plugs 3502 are removed using the remotely operated crane. The removed ceiling plugs 3502 are then loaded into one or more waste containers. In a particular embodiment, ceiling plugs 3502 are approximately one foot in width, one foot in length and four feet in depth. In alternate embodiments, ceiling plugs 3502 have varying sizes.

Figure 36:
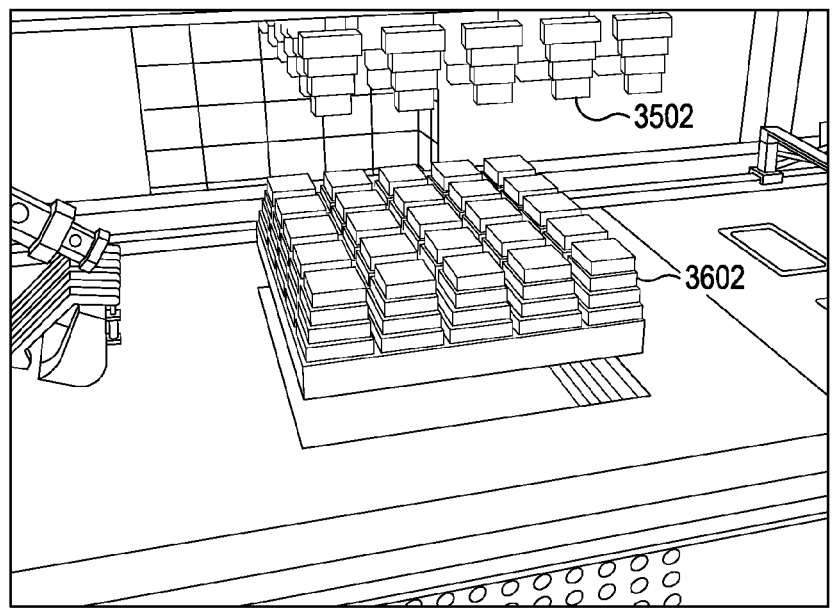
FIG. 36 shows exemplary aspects of the bioshield plugs, according to one embodiment.

FIG. 36 shows exemplary aspects of the bioshield plugs, according to one embodiment. After removal of ceiling plugs 3502, a second layer of plugs 3602 are removed from the bioshield. In a particular embodiment, plugs 3602 have dimensions of approximately four feet in width, four feet in length and 2.5 feet in depth. Particular embodiments of the bioshield may include any number of plugs arranged in any number of layers.

Figure 37:
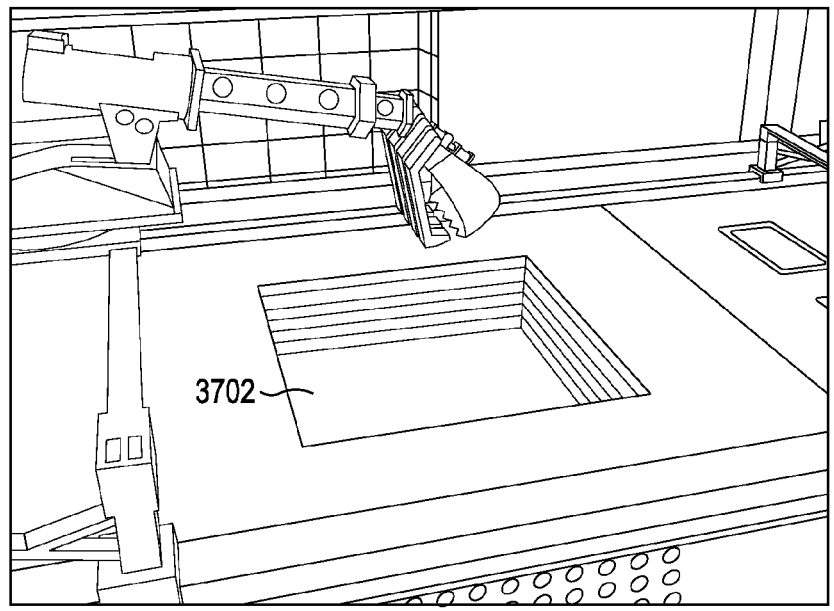
FIG. 37 shows exemplary aspects of an air-tight membrane, according to one embodiment.
Figure 38:
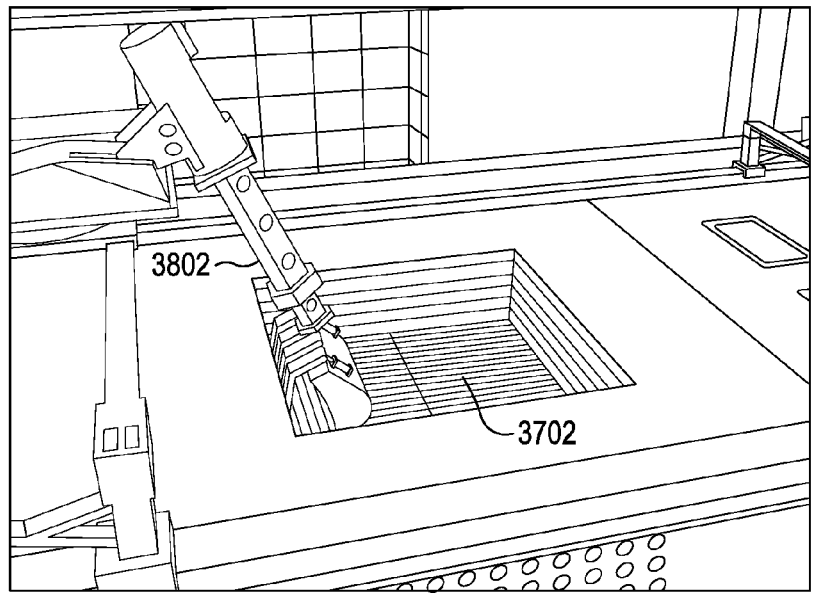
FIG. 38 shows exemplary aspects of removal of the air-tight membrane using the excavator arm.

FIG. 37 shows exemplary aspects of an air-tight membrane 3702, according to one embodiment. In a particular embodiment, the bioshield has multiple air-tight membranes, and air-tight membrane 3702 is an upper air-tight membrane. Air-tight membrane 3702 is constructed of one or more layers of aluminum sheet. FIG. 38 shows exemplary aspects of removal of air-tight membrane 3702 using the excavator arm 3802. After removal, air-tight membrane 3702 is loaded into one or more waste containers located near the bioshield.

Figure 39:
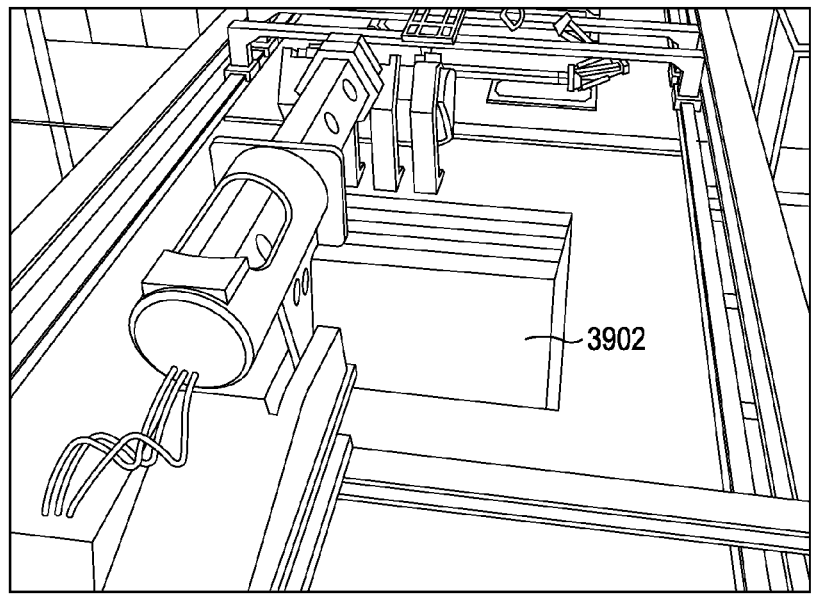
FIGS. 39 and 40 show exemplary aspects of a graphite core, according to one embodiment.
Figure 40:
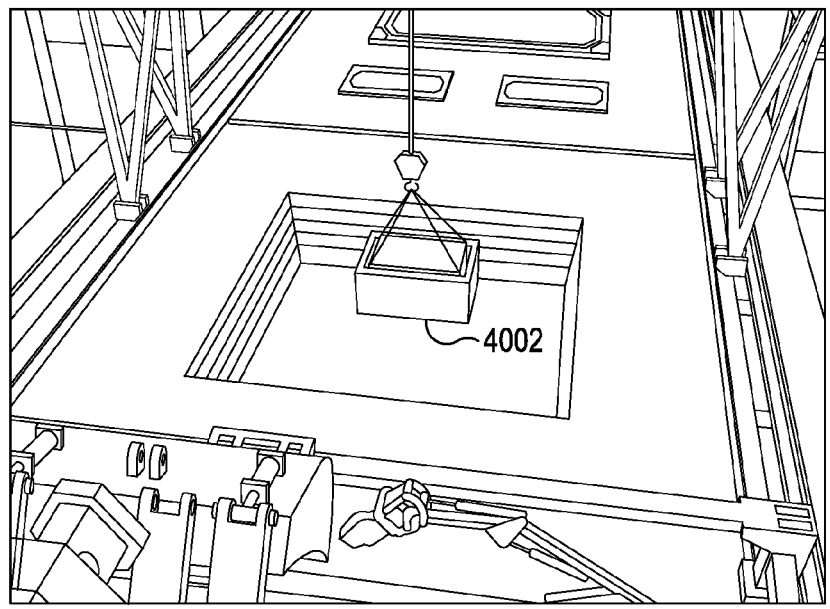

FIG. 39 shows exemplary aspects of a graphite core, according to one embodiment. After removal of air-tight membrane 3702, a top layer 3902 of the graphite core is exposed. FIG. 40 shows the crane positioning a container 4002 into the bioshield. In a particular embodiment, container 4002 is a waste sack positioned in a lift fixture. The waste sack may also be referred to as a "soil sack". The lift fixture holds and supports the waste sack during the loading operation. During use, the lift fixture protects the waste sack from damage and prevents contamination of its exterior surface. The lift fixture supports placing of the waste sack in a waste container in a controlled manner. The gantry crane discussed herein lifts and moves the lift fixture.

Figure 41:
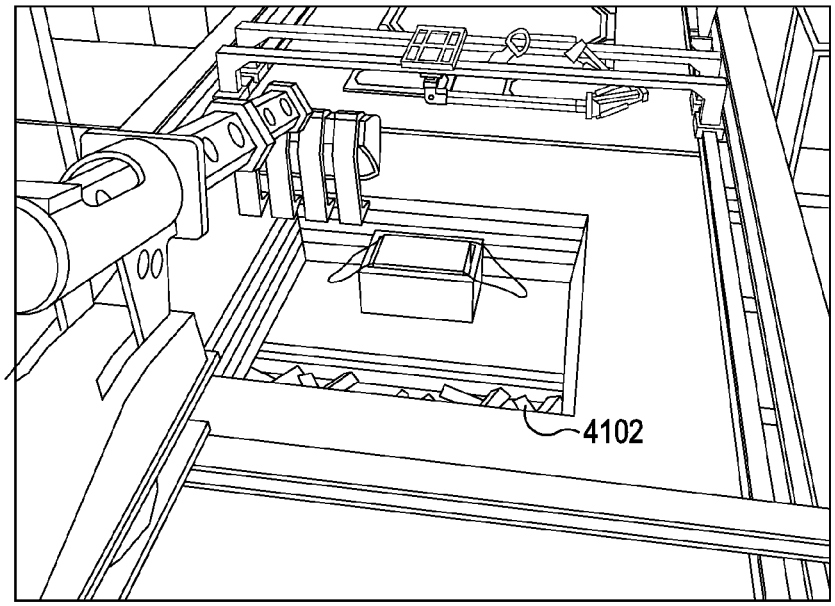
FIGS. 41-43 show exemplary aspects of loosening and collecting the graphite core, according to one embodiment.

FIG. 41 shows exemplary aspects of loosening the graphite core, according to one embodiment. In a particular implementation, the excavator arm "loosens" or otherwise breaks up the graphite core into graphite blocks 4102 (also referred to as "graphite pieces"). In a particular embodiment, the excavator arm includes a bucket with an articulated thumb to loosen the graphite blocks. The thumb includes teeth of the type found on standard excavator buckets. When the thumb is closed, the bucket and thumb operate as a standard bucket. When the thumb is open, the bucket is used to grasp graphite or graphite pieces for loosening and/or loading into a waste container. The bucket is detachable from the excavator arm to allow attachment of other tools to the arm.

Figure 42:
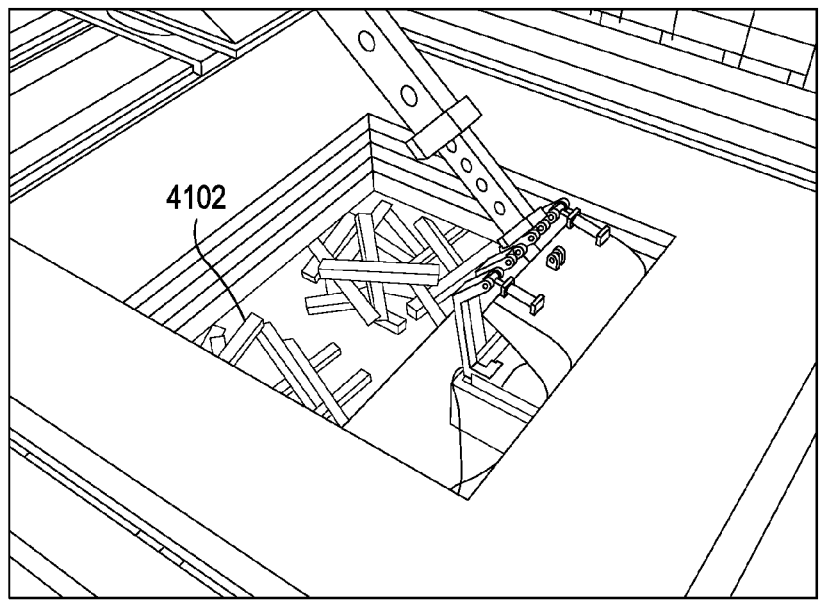
Figure 43:
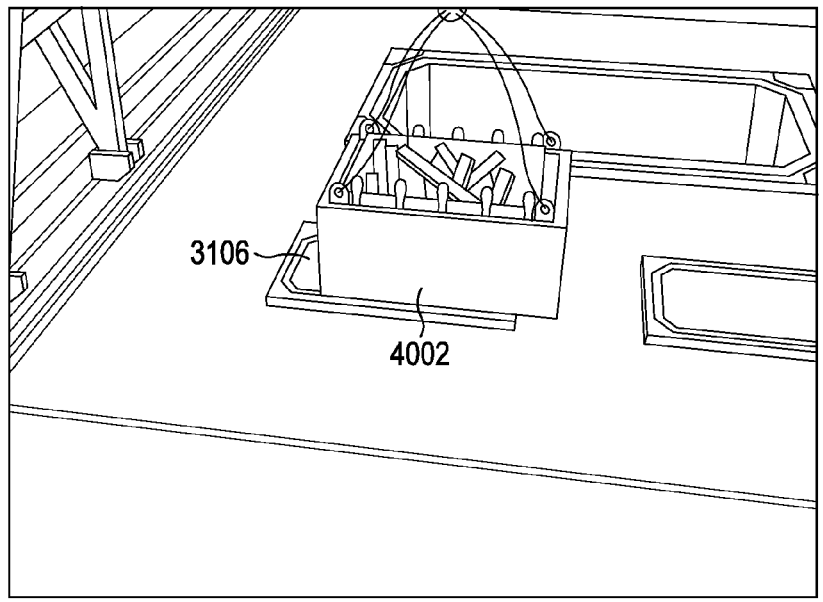

FIG. 42 shows collection of graphite blocks 4102 by the excavator arm and placement in container 4002 (e.g., the waste sack). After container 4002 is full of graphite blocks 4102, the container is lifted from the bioshield and placed into a waste container located near the bioshield, as shown in FIG. 43. In a particular embodiment, this is accomplished by lowering container 4002 through an aperture in barrier floor 3106 and into a waste container 3104 resting on lift table 3102 (FIG. 31).

In one implementation, a release mechanism is operated on the lift fixture and the lift fixture is removed from the waste container leaving the waste sack in the waste container. Operators then install the waste container lid, decontaminate the waste container, survey the exterior of the waste container, and remove the waste container from the contamination control enclosure.

The above procedures are repeated until all of the graphite is removed from the bioshield. During removal of the graphite, if other in-core materials are encountered that need size reduction, the excavator arm is reconfigured to include a shear attachment or similar tool. For example, a hydraulic shear is capable of shearing 2"×2" square steel bars (e.g., bars similar to control rods) and reducing the size of control rods, tie rods, structural members and other components. The in-core materials are then reduced in size and the excavator arm is reconfigured with the bucket attachment and the size-reduced in-core materials are removed with the graphite blocks.

After all graphite is removed from the bioshield, the excavator arm is reconfigured to include a HEPA (high efficiency particulate air) vacuum attachment, which removes additional debris from the floor and walls of the bioshield. The HEPA vacuum attachment includes three components, the vacuum unit with HEPA filtration, the collection container, and the vacuum tool. The collection container is located on the trolley. When the collection container is full, it can be removed from the trolley and emptied into a waste container for disposal with the other reactor debris. The vacuum tool is attached to the excavator arm and is positioned by movement of the arm.

Finally, a fixative coating is applied to all interior surfaces of the bioshield. The excavator arm has two integrated spray systems. One spray system is for dust suppressant applied to materials during the excavation process. The other spray system is for application of fixative material, which is typically sprayed onto all surfaces to lock any loose contaminated particles to the interior surface of the bioshield. Use of the fixative material prevents contaminated particles from being suspended in air or transferred to another surface during future handling. In one implementation, the pumps associated with the spray systems are located outside the contamination control enclosure to permit easy maintenance, repair, and replenishment of spray materials. The spray equipment is also configured to permit flushing of the spray lines remotely.

Figure 44:
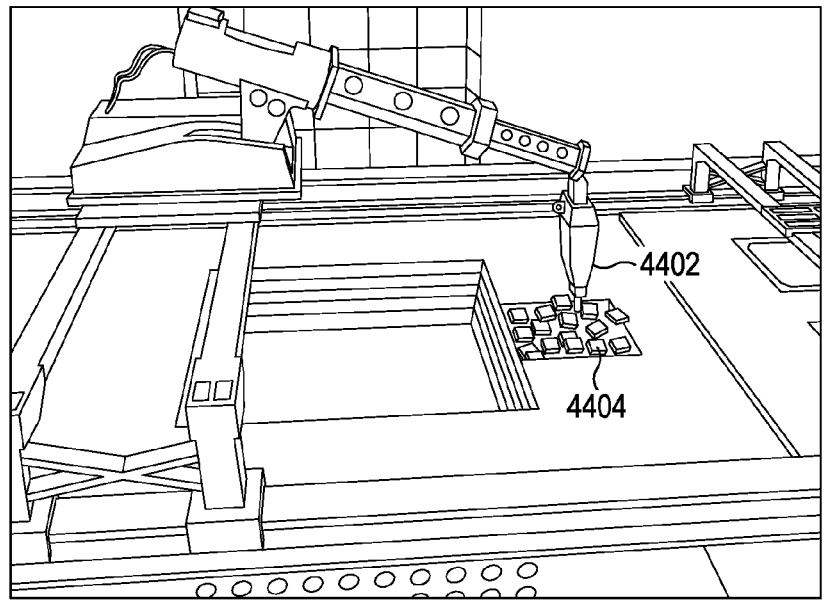
FIGS. 44 and 45 show exemplary aspects of removing the bioshield roof, according to one embodiment.

FIG. 44 shows exemplary aspects of removing the bioshield roof, according to one embodiment. After removal of the graphite core is complete, the excavator arm is configured to reduce the size of the bio shield packaging. A hydraulic breaker hammer 4402 is used to reduce the size of the high density concrete in the bioshield roof into smaller pieces 4404. Pieces 4404 are also referred to as "rubblized" material. Hydraulic breaker hammer 4402 is also useful in breaking welds and light structural steel members that are embedded within the concrete. Hydraulic breaker hammer 4402 is also used to reduce the size of the graphite core components.

In a particular embodiment, hydraulic breaker hammer 4402 can be fitted with several different tool bits. One tool bit is a standard moil point used to rubblize concrete. A chisel tool is useful in rubblizing concrete as well as severing and/or reducing the size of other reactor components. Another tool bit is a modified chisel, which includes a v-shaped groove to allow positioning of the chisel on pipes, sheets, and tubing material that requires severing. The v-shaped groove also maintains the chisel in the appropriate location during operation, such as severing a component.

Figure 45:
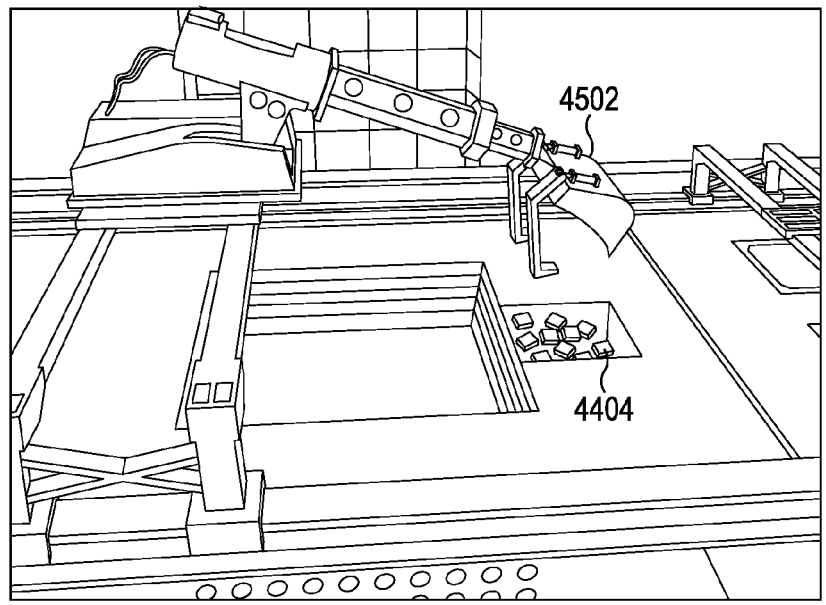

FIG. 45 shows removal of pieces 4404 using a bucket 4502 attached to the excavator arm. Bucket 4501 collects pieces 4404 for placement into one or more waste containers. The bioshield is rubblized and removed until the exterior walls remain.

Figure 46:
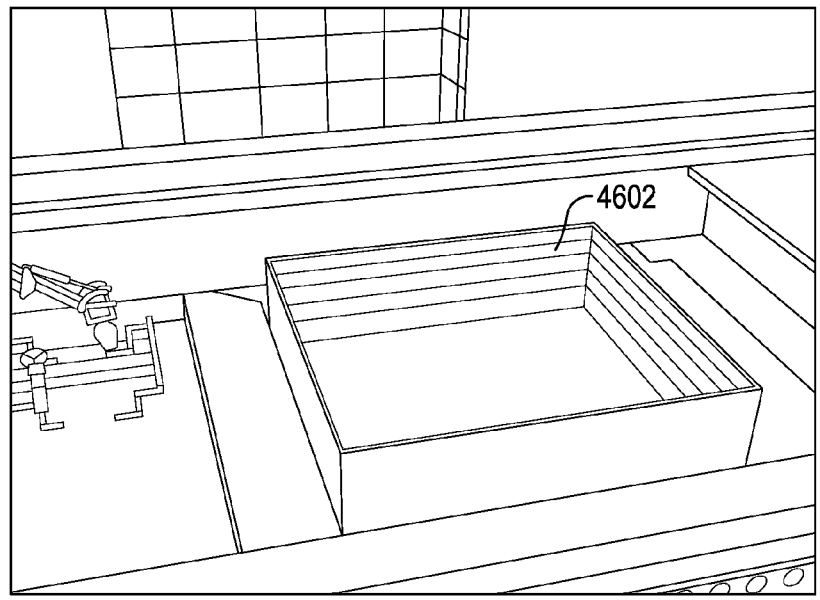
FIG. 46 shows exemplary aspects of the bioshield roof, according to one embodiment.
Figure 47:
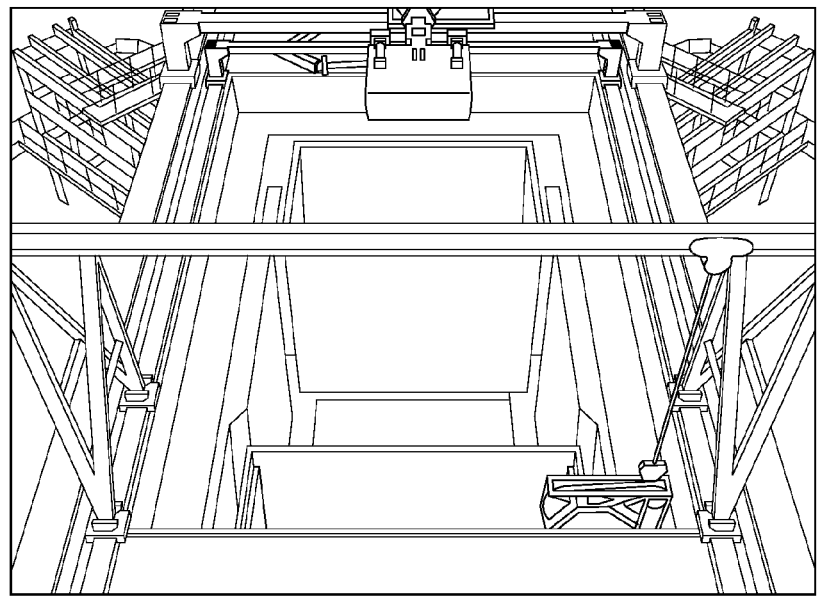
FIG. 47 shows the interior of an example bioshield after removal of the roof structure.

FIG. 46 shows exemplary aspects of the bioshield roof, according to one embodiment. Steel structures and plates 4602 associated with the bioshield roof are reduced in size using one or more thermal and/or mechanical cutting tools. The structural pieces are then moved using the remotely operated crane using one or more lifting attachments. The structural pieces are then placed in one or more waste containers. After the roof structure has been removed, the interior surfaces of the bioshield are exposed. FIG. 47 shows the interior of an example bioshield after removal of the roof structure.

After the roof structure of the bioshield is removed, various tools and equipment are used to remove and reduce the size of the remaining bioshield components. For example, milling machines, thermal cutting equipment, and saws are useful in separating steel lining components from the concrete wall and reducing the size of the steel lining components. In particular implementations, the remotely operated crane places equipment and tools into the bioshield for use in removing the remaining bioshield components. After reducing the size of the bioshield components, the pieces are moved to one or more storage containers located near the bioshield using the crane.

Figure 48:
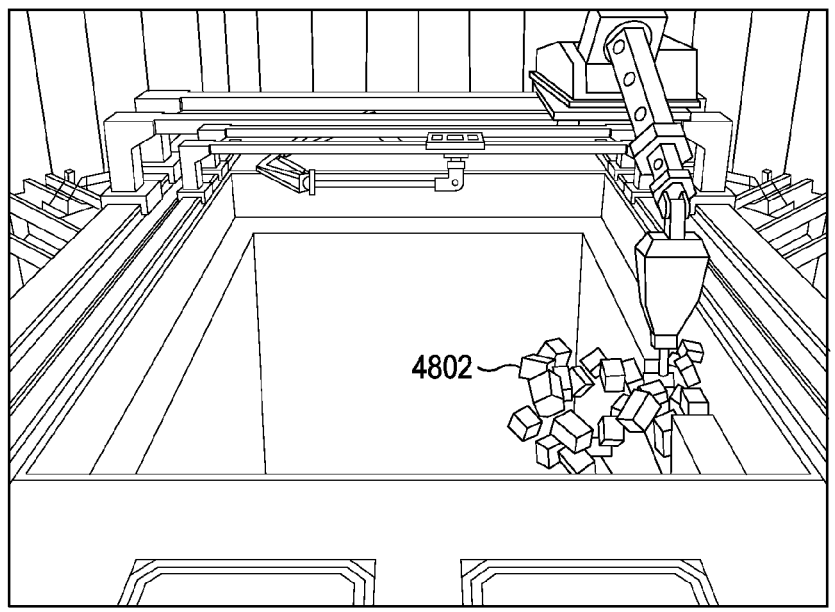
FIG. 48 shows exemplary aspects of removing the bioshield walls, according to one embodiment.

FIG. 48 shows exemplary aspects of removing the bioshield walls, according to one embodiment. In the example of FIG. 48, a hydraulic breaker hammer breaks the bioshield walls into smaller pieces 4802. If structural components are encountered in the bioshield wall during this operation, the hammer, shear, or other tool is used to sever the components. The pieces 4802 are collected using a bucket connected to the excavator arm, and moved to one or more storage containers. After the internal components of the bioshield are removed, another layer of fixative coating is sprayed on all internal surfaces of the bioshield.

Figure 49:
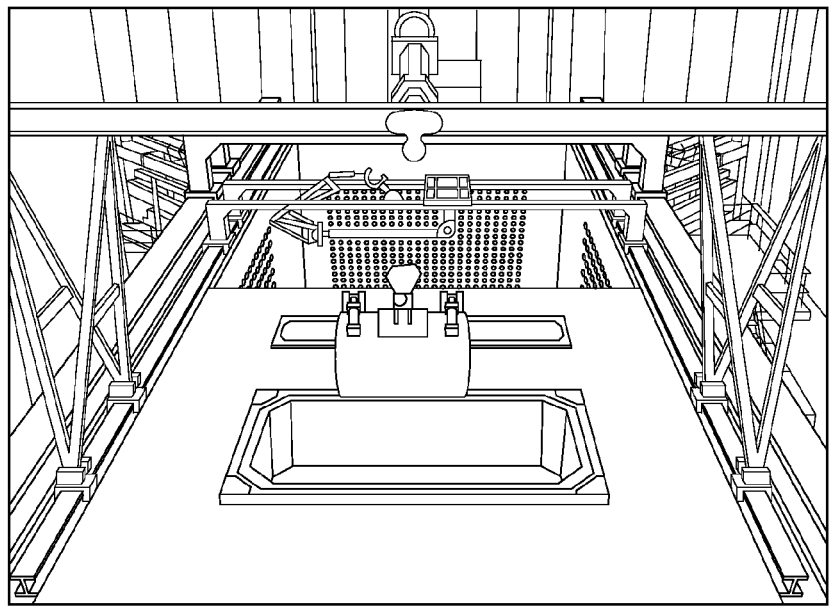
FIGS. 49 and 50 show exemplary aspects of demobilizing the dismantling equipment, according to one embodiment.

FIG. 49 shows exemplary aspects of demobilizing the dismantling equipment, according to one embodiment. After the internal portions of the bioshield wall are removed, the risks due to radiation exposure are significantly reduced. At this point, the excavator arm and other removal equipment/tools are disassembled and placed in one or more waste containers.

Figure 50:
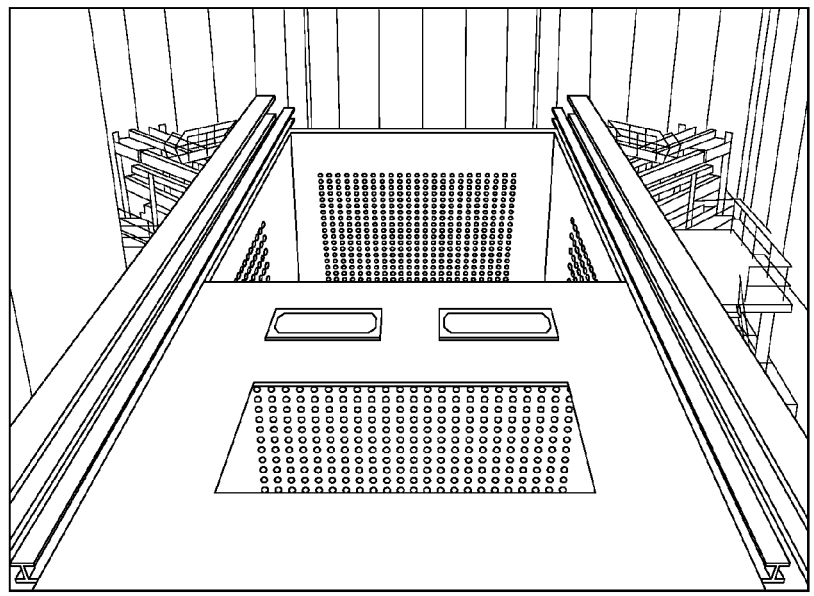

FIG. 50 shows an exemplary environment after removing the excavator arm and other equipment/tools. The environment shown in FIG. 50 includes the exterior skin of the bioshield, the remaining structural supports associated with the dismantling structure and the contamination control enclosure. The next step in the dismantling process removes the contamination control enclosure and moves the enclosure to one or more waste containers. The structural supports are then removed and placed into waste containers. The balconies and control rod drive mechanisms are then separated from the exterior skin of the bioshield.

Figure 51:
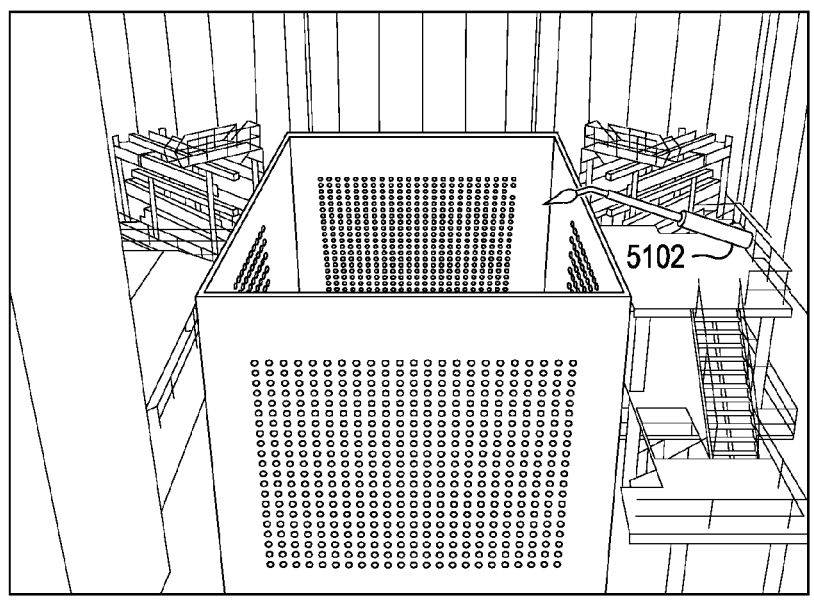
FIGS. 51 and 52 show exemplary aspects of removing the exterior skin of the bioshield, according to one embodiment.

FIG. 51 shows exemplary aspects of removing the exterior skin of the bioshield, according to one embodiment. In particular implementations, various tools are used to reduce the skin of the bioshield into smaller pieces. For example, plasma cutters, and similar thermal cutting tools are useful in removing the skin of the bioshield. A thermal cutter 5102 attached to the excavator arm is shown in FIG. 51 for removing the exterior skin of the bioshield as well as reducing the size of the steel components in the bioshield. Thermal cutter 5102 includes a six-axis robot and support framework that is positioned in the bioshield using the excavator arm. After thermal cutter 5102 is positioned, a cut path is programmed into a robot controller and the system is started. The torch is remotely ignited and moved along the preprogrammed path. When the cut is complete, the cut portion is removed from the bioshield and loaded into a waste container using, for example, a remotely operated plate clamp and crane.

A thermal cutting smoke removal system minimizes the impact of smoke on the ventilation HEPA filters during thermal cutting operations. Flexible and rigid ducting connect the filtration equipment to a portable hood that mounts on a wall of the bioshield. The portable hood includes fireproof curtains to account for irregularities in the cutting surface.

Figure 52:
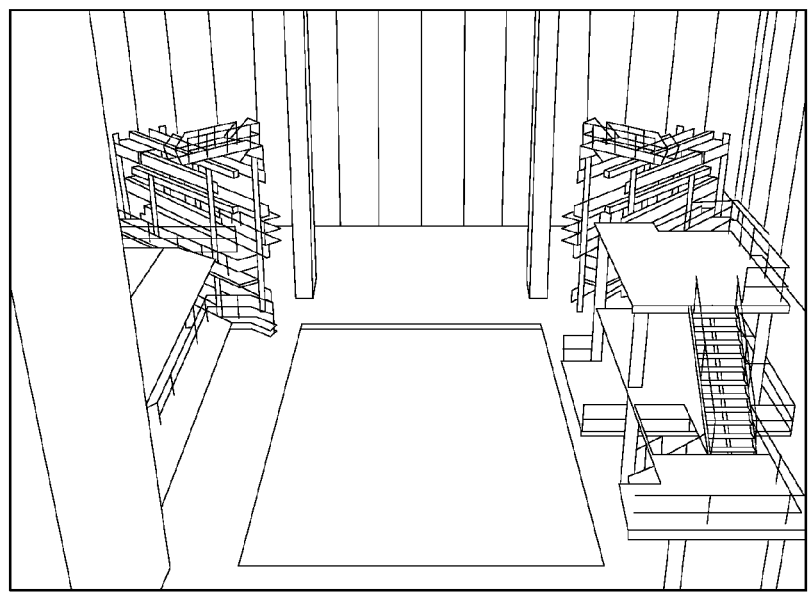

FIG. 52 shows the environment after removal of the exterior skin of the bioshield. At this point, the floor is coated with a fixative coating. The recessed portion of the floor is then reinforced and filled with concrete to provide a substantially level surface.

Figure 53:
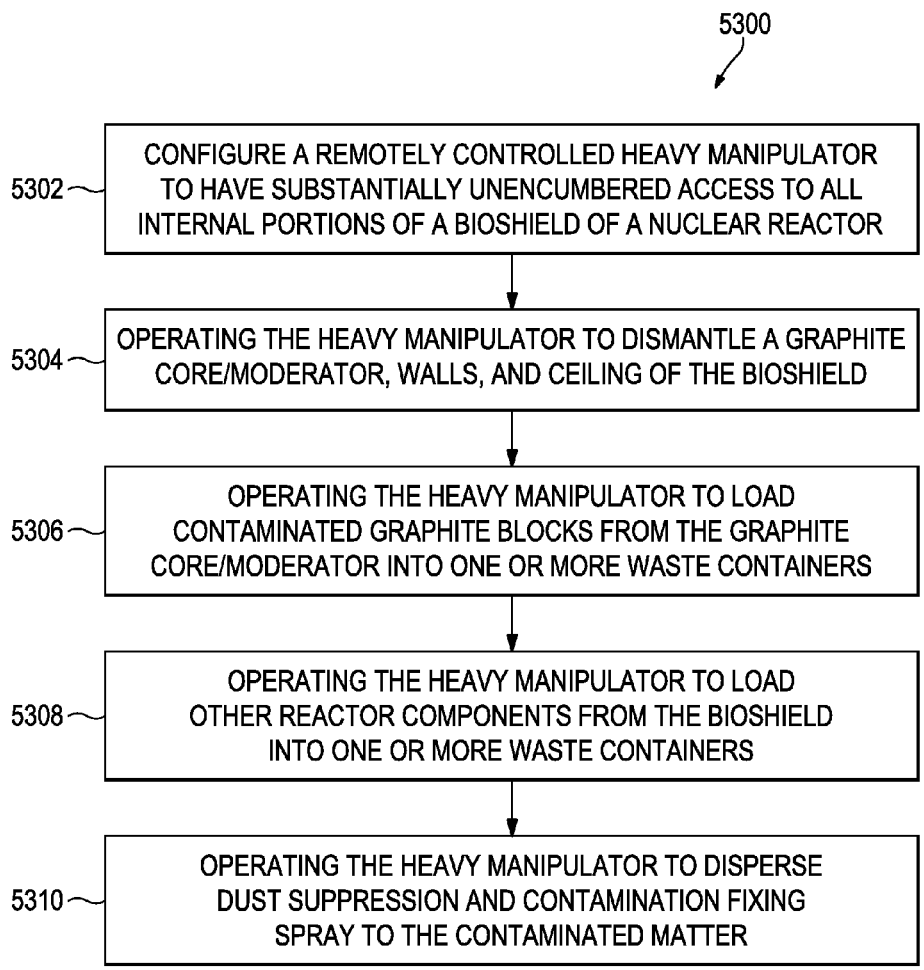
FIG. 53 is a flow diagram illustrating an example procedure for dismantling a nuclear reactor, according to one embodiment.

FIG. 53 is a flow diagram illustrating an example procedure 5300 for dismantling a nuclear reactor, according to one embodiment. Initially, a remotely controlled heavy manipulator is configured to have substantially unencumbered access to all internal portions of a bioshield of a nuclear reactor (block 5302). The heavy manipulator is operated to dismantle a graphite core/moderator, walls, and ceiling of the bioshield (block 5304) and load contaminated graphite blocks into one or more waste containers (block 5306). The heavy manipulator is also operated to load other reactor components from the bioshield into one or more waste containers (block 5308). Finally, the heavy manipulator is operated to disperse dust suppression and contamination fixing spray to the contaminated matter (block 5310).

Figure 54:
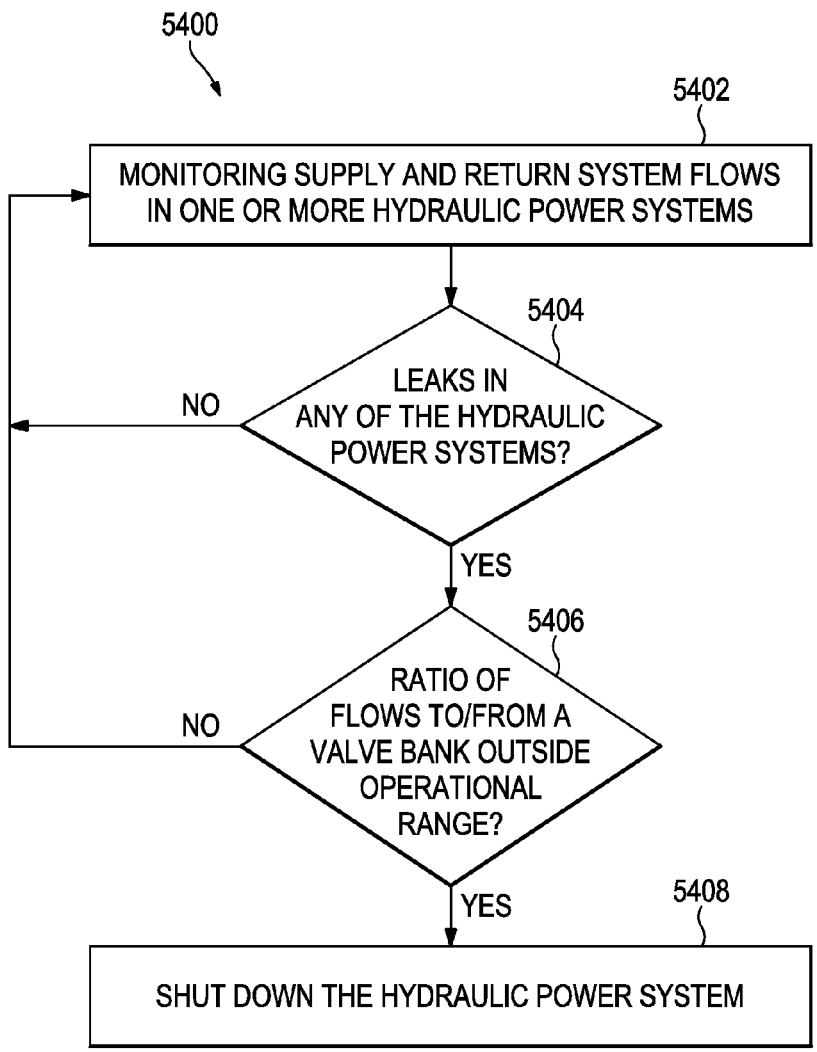
FIG. 54 is a flow diagram illustrating an example procedure for managing a hydraulic power system, according to one embodiment.

FIG. 54 is a flow diagram illustrating an example procedure 5400 for managing a hydraulic power system, according to one embodiment. Initially, the procedure monitors supply and return system flows in one or more hydraulic power systems (block 5402). The procedure continues by determining whether any leaks exist in the hydraulic power systems (block 5404). If a leak is detected, the procedure determines whether a ratio of flows to and from a valve bank is outside a predetermined operational range (block 5406). If the ratio is outside the operational range, the hydraulic power systems are shut down (block 5408). If the ratio is within the operational range, the procedure continues monitoring the system flows at block 5402.

Figure 55:
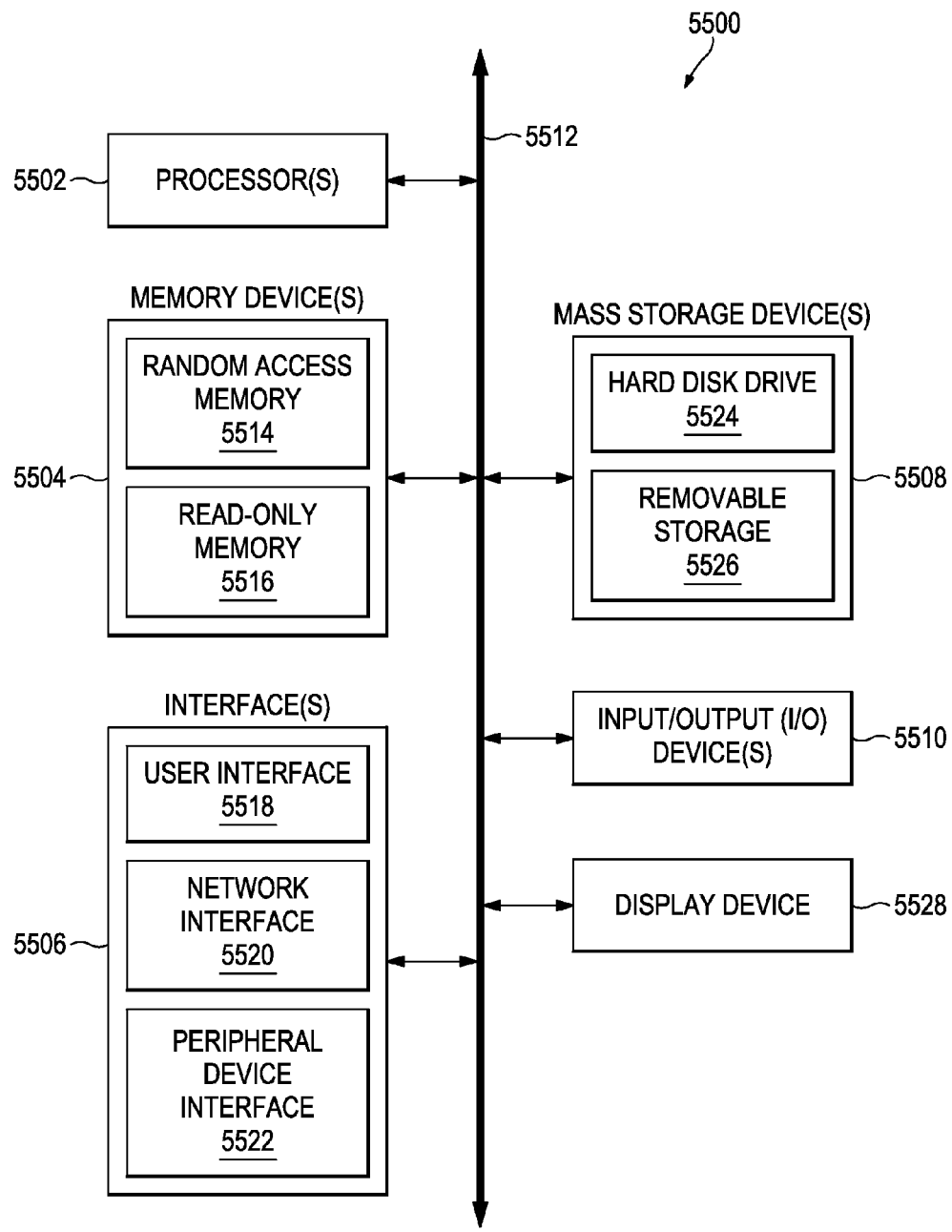
FIG. 55 is a block diagram illustrating an example computing device, according to one embodiment.

FIG. 55 is a block diagram illustrating an example computing device 5500, according to one embodiment. Computing device 5500 may be used to perform various procedures, such as those discussed herein. Computing device 5500 can function as a server, a client, a worker node, or any other computing entity. Computing device 5500 can be any of a wide variety of computing devices, such as a desktop computer, a notebook computer, a server computer, a handheld computer, and the like.

Computing device 5500 includes one or more processor(s) 5502, one or more memory device(s) 5504, one or more interface(s) 5506, one or more mass storage device(s) 5508, one or more Input/output (I/O) device(s) 5510, and a display device 5528 all of which are coupled to a bus 5512. Processor(s) 5502 include one or more processors or controllers that execute instructions stored in memory device(s) 5504 and/or mass storage device(s) 5508. Processor(s) 5502 may also include various types of computer-readable media, such as cache memory.

Memory device(s) 5504 include various computer-readable media, such as volatile memory (e.g., random access memory (RAM)) 5514 and/or nonvolatile memory (e.g., read-only memory (ROM) 5516). Memory device(s) 5504 may also include rewritable ROM, such as Flash memory.

Mass storage device(s) 5508 include various computer readable media, such as magnetic tapes, magnetic disks, optical disks, solid state memory (e.g., Flash memory), and so forth. As shown in FIG. 55, a particular mass storage device is a hard disk drive 5524. Various drives may also be included in mass storage device(s) 5508 to enable reading from and/or writing to the various computer readable media. Mass storage device(s) 5508 include removable media 5526 and/or non-removable media.

I/O device(s) 5510 include various devices that allow data and/or other information to be input to or retrieved from computing device 5500. Example I/O device(s) 5510 include cursor control devices, keyboards, keypads, microphones, monitors or other display devices, speakers, printers, network interface cards, modems, lenses, CCDs or other image capture devices, and the like.

Display device 5528 includes any type of device capable of displaying information to one or more users of computing device 5500. Examples of display device 5528 include a monitor, display terminal, video projection device, and the like.

Interface(s) 5506 include various interfaces that allow computing device 5500 to interact with other systems, devices, or computing environments. Example interface(s) 5506 include any number of different network interfaces 5520, such as interfaces to local area networks (LANs), wide area networks (WANs), wireless networks, and the Internet. Other interfaces include user interface 5518 and peripheral device interface 5522.

Bus 5512 allows processor(s) 5502, memory device(s) 5504, interface(s) 5506, mass storage device(s) 5508, and I/O device(s) 5510 to communicate with one another, as well as other devices or components coupled to bus 5512. Bus 5512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 5500, and are executed by processor(s) 5502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

CONCLUSION

Although the systems and methods for dismantling a nuclear reactor have been described in language specific to structural features and/or methodological operations or actions, it is understood that the implementations defined in the appended claims are not necessarily limited to the specific features or actions described. Rather, the specific features and operations of dismantling a nuclear reactor are disclosed as exemplary forms of implementing the claimed subject matter.

What is claimed is:

1. A system for dismantling a nuclear reactor, the system comprising:
a remotely controlled heavy manipulator ("manipulator") operatively coupled to a support structure, and a control station in a non-contaminated portion of a workspace, the support structure providing the manipulator with access into a bioshield of a nuclear reactor, at least one computing device in the control station provides programmatic logic to perform operations including:
(a) providing instructions to the manipulator wherein the manipulator has substantially unencumbered access to all internal portions of the bioshield of the nuclear reactor;
(b) dismantling, using the manipulator, a graphite moderator, concrete or steel walls, and a ceiling of the bioshield; and
(c) loading, using the manipulator, contaminated graphite blocks and other components from the bioshield into one or more waste containers.

2. The system of claim 1, wherein the manipulator is configured to disperse dust suppression and contamination fixing spray to contaminated matter.

3. The system of claim 1 wherein the support structure comprises a set of runway girders supported by columns, a bridge, and a trolley, the bridge and trolley supporting the manipulator the bridge and trolley providing the manipulator with substantially unencumbered access into the bioshield.

4. The system of claim 3 wherein the bridge and trolley further provide the manipulator with a boundary for its range of motion.

5. The system of claim 3 wherein the operations further comprise moving the bridge on the support structure in forward/reverse directions, and positioning the trolley on the bridge in left/right directions.

6. The system of claim 1 wherein the dismantling comprises remote removal of the bioshield to expose the graphite moderator.

7. The system of claim 1 wherein the dismantling comprises demolition of the bioshield to expose the graphite moderator.

8. The system of claim 1 wherein the dismantling comprises controlling motion of the manipulator, the motion comprising one or more of side-to-side, front-to-back, wrist rotate, arm pivot, arm rotate, forearm extend and retract, and tool pitch joint motion(s).

9. The system of claim 1 wherein the dismantling comprises interfacing the manipulator with one or more of a hydraulic hammer, a bucket and a thumb, a clamshell bucket, a hydraulic shear, dust suppression/contamination fixing spray equipment, a filtered vacuum system, radiological survey equipment and thermal cutting equipment.

10. The system of claim 1 wherein the dismantling comprises deploying, by the manipulator, cutting equipment mounted to a multi-axis robot and support framework, and wherein the operations further comprise:
uploading a cut path into a controller on the multi-axis robot;
remotely igniting a torch portion of the thermal cutting equipment; and
initiating operations of the thermal cutting equipment, the operations comprising automatically moving the torch portion over the cut path to size-reduce a portion of the bioshield.

11. The system of claim 10, further comprising a thermal cutting smoke removal system that returns exhaust to inside of the bioshield during thermal cutting operations.

12. The system of claim 1 wherein the dismantling comprises deploying a breaker hammer operatively coupled to the manipulator to: (a) loosen the graphite blocks; (b) break up concrete in the bioshield to form the rubblized concrete; and (c) sever/size-reduce other reactor components in the bioshield.

13. The system of claim 12 wherein the dismantling further comprises controlling position of a modified chisel on piping, sheets, and tubing for severing, the modified chisel being operatively coupled to the breaker hammer, the modified chisel being operatively coupled to the manipulator.

14. The system of claim 1 wherein the support structure comprises a set of rails upon which a gantry crane is operatively coupled, and wherein the operations for loading the contaminated graphite blocks and other components from the bioshield into one or more waste containers further comprises operations for implementing, via the gantry crane, lifting functions related to graphite block removal and bioshield demolition.

15. The system of claim 14 wherein the operations further comprise:
automatically determining a waste load total in a container of the one or more waste containers; and
evaluating the waste load total to determine when the container is not overloaded with material removed from the bioshield.

16. The system of claim 14 wherein the operations further comprise:

supporting the container during the operations for loading;
preventing contamination of exterior surfaces of the container; and
placing the container into a larger waste container in a controlled manner.

17. The system of claim 1 wherein the operations further comprise accessing an area external of the bioshield to perform one or more of in-house qualification testing, maintenance, tool changes, and loading waste containers.

18. The system of claim 1 wherein the operations further comprise:
monitoring supply and return system flows in one or more hydraulic power systems;
determining, via the monitoring, whether there are any leaks in the one or more hydraulic power systems;
responsive to determining that there is a leak in the one or more hydraulic power systems, determining whether a ratio of flows to and from a valve bank is outside of a predetermined set operational range; and
responsive to determining that the ratio of flows is outside of the predetermined set operational range, automatically shutting down the one or more hydraulic power systems.

19. The system of claim 1, and further comprising primary and secondary hydraulic systems to power the dismantling, loading, and dispersing operations, the secondary hydraulic system providing redundancy.

20. The system of claim 1 wherein the system further comprises a ventilation system, and wherein the operations further comprise using the ventilation system for:
providing negative pressure in a contamination control enclosure creating access;
capturing in an airflow substantially all airborne particles generated during dismantling and removal of the graphite moderator; and
drawing all captured airborne particles into the bioshield.

21. The system of claim 1 wherein the system further comprises one or more cameras operatively coupled to the manipulator to provide visual feedback to an operator in the control station.

22. The system of claim 1, further comprising at least one camera configured to provide visual feedback to an operator in the control station.

23. The system of claim 1 wherein the control station comprises at least one operator station comprising controls configured to operate the manipulator and a gantry crane, the operator station further comprising a human machine interface to control selected tool functions and provide respective operator(s) with feedback on operation and location of corresponding equipment.

24. The system of claim 23 wherein the controls comprise at least one analog joystick, and wherein the operations further comprise operations to interface between the at least one analog joystick and pulse width modulation controlled proportional values substituted for Original Equipment Manufacture values associated with the manipulator.

25. A tangible computer readable memory comprising computer-program instructions executable by a processor, the computer-program instructions when executed by the processor for performing operations comprising:
providing instructions to a remotely controlled heavy manipulator ("manipulator") wherein the manipulator has substantially unencumbered access to all internal portions of a bioshield of a nuclear reactor;
dismantling, using the manipulator, a graphite moderator, walls, and a ceiling of the bioshield;
loading, using the manipulator, contaminated graphite blocks from the graphite moderator and other reactor components from the bioshield into one or more waste containers; and
dispersing, using the manipulator, dust suppression and contamination fixing spray to contaminated matter.

26. A system for dismantling a nuclear reactor, the system comprising:
dismantling means to dismantle a graphite moderator, concrete walls, and a ceiling of a bioshield of a nuclear reactor, the manipulator being provided with remote access to all internal portions of the bioshield;
loading means to load contaminated graphite blocks from the graphite moderator and rubblized concrete from the bioshield into one or more waste containers; and
dispersing means to spray dust suppression and contamination fixing spray to contaminated material.

27. The system of claim 26, further comprising removing means creating an access into the bioshield to expose the graphite moderator during nuclear reactor bioshield dismantling operations.

28. The system of claim 26, further comprising controlling means to control motion of a remotely controlled heavy manipulator ("manipulator") during nuclear reactor bio shield dismantling operations, the motion comprising one or more of side-to-side, front-to-back, wrist rotate, arm pivot, arm rotate, forearm extend and retract, and tool pitch joint motion(s).

29. The system of claim 28, further comprising interfacing means to interface the manipulator with one or more of a hydraulic hammer, a bucket and a thumb, a clamshell bucket, a hydraulic shear, dust suppression/contamination fixing spray equipment, a filtered vacuum system, radiological survey equipment and cutting equipment.

30. The system of claim 26, further comprising:
deploying means to deploy cutting equipment during nuclear reactor bioshield dismantling operations;
uploading means to upload a cut path to the cutting equipment;
remote igniting means to allow for remote torch ignition on the cutting equipment; and
initiating means to initiate cutting equipment operations involving automatic torch positioning as defined by the cut path to size-reduce a portion of the bioshield.

31. The system of claim 30, further comprising smoke removal means to remove smoke generated by thermal cutting processes and return exhaust to inside of the bioshield.

32. The system of claim 26, further comprising hammering means to (a) loosen the graphite blocks, (b) break up concrete in the bioshield to form the rubblized concrete, and (c) sever/size-reduce other reactor components in the bioshield.

33. The system of claim 26 wherein the loading means further comprise means to load the contaminated graphite blocks and rubblized concrete from the bio shield into one or more waste containers.

34. The system of claim 33 wherein the loading means further comprise:
determining means to determine a total waste load in a container of the one or more waste containers; and
evaluating and determining means to evaluate the total waste load and determine when the container is not overloaded with material removed from the bioshield.

35. The system of claim 33 wherein the loading means further comprise:
supporting means to support the container during the operations for loading;

preventing means to prevent contamination of exterior surfaces of the container; and placing means to place the container into a larger waste container in a controlled manner.

36. The system of claim 26, further comprising accessing means to access an area external of the bioshield to perform one or more of in-house qualification testing, maintenance, and loading of waste containers.

37. The system of claim 26, further comprising:

monitoring means to monitor supply and return system flows in one or more hydraulic power systems;

evaluating and determining means to evaluate results of the monitoring means and determine whether there are any leaks in the one or more hydraulic power systems that require system shutdown; and shutting down means to automatically shutdown one or more hydraulic power systems responsive to determining that a leak detected in the one or more hydraulic power systems requires system shutdown.

38. The system of claim 26, further comprising powering means to power operations to dismantle a nuclear reactor.

39. The system of claim 26, further comprising:

pressuring means to provide a negative pressure in a contamination control and closure prior to creating access through the bioshield to access a graphite moderator;

capturing means to capture in an airflow substantially all airborne particles generated during dismantling and removal of the graphite moderator; and drawing means to draw all captured airborne particles into the bioshield.

40. The system of claim 26, further comprising remote controlling means in a non-contaminated part of a workspace to remotely control machinery operations to dismantle a nuclear reactor and provide one or more operators with feedback on operation and location of corresponding equipment.

* * * * *